United States Patent
Eura et al.

(10) Patent No.: US 7,916,903 B2
(45) Date of Patent: Mar. 29, 2011

(54) PERSONAL IDENTIFICATION DEVICE, PERSONAL IDENTIFICATION METHOD, UPDATING METHOD FOR IDENTIFICATION DICTIONARY DATA, AND UPDATING PROGRAM FOR IDENTIFICATION DICTIONARY DATA

(75) Inventors: Yuka Eura, Tokyo (JP); Tamaki Kojima, Kanagawa (JP)

(73) Assignee: Sony Corporation (JP)

( * ) Notice: Subject to any disclaimer, the term of this patent is extended or adjusted under 35 U.S.C. 154(b) by 809 days.

(21) Appl. No.: 11/983,691

(22) Filed: Nov. 9, 2007

(65) Prior Publication Data

US 2008/0123907 A1 May 29, 2008

(30) Foreign Application Priority Data

Nov. 21, 2006 (JP) .............................. P2006-313735

(51) Int. Cl.
*G06K 9/00* (2006.01)
*H04N 9/07* (2006.01)

(52) U.S. Cl. ....................................... 382/118; 348/267
(58) Field of Classification Search .................. 382/100, 382/115, 116, 117, 118; 348/154, 155, 169, 348/170, 171, 172, 267; 379/93.03, 207.13
See application file for complete search history.

(56) References Cited

U.S. PATENT DOCUMENTS

| | | | | |
|---|---|---|---|---|
| 7,239,725 | B2 * | 7/2007 | Dobashi ...................... | 382/118 |
| 7,711,157 | B2 * | 5/2010 | Duong et al. ................ | 382/118 |
| 7,734,072 | B2 * | 6/2010 | Yamaguchi .................. | 382/118 |
| 7,804,982 | B2 * | 9/2010 | Howard et al. .............. | 382/115 |
| 2004/0240711 | A1 | 12/2004 | Hamza et al. | |

FOREIGN PATENT DOCUMENTS

| | | |
|---|---|---|
| JP | 11-175718 A | 7/1999 |
| JP | 2000-123170 A | 4/2000 |
| JP | 2000-214238 A | 8/2000 |
| JP | 2002-163654 A | 6/2002 |
| JP | 2007-516503 A | 12/2004 |
| JP | 2005-044330 A | 2/2005 |
| JP | 2006-072540 A | 3/2006 |
| JP | 2006-072770 A | 3/2006 |
| JP | 2006-092491 A | 4/2006 |

OTHER PUBLICATIONS

Kohtaro Sabe and Kenichi Hidai, "Real-time Multi-view Face Detection using Pixel Difference Feature."

* cited by examiner

*Primary Examiner* — Abolfazl Tabatabai
(74) *Attorney, Agent, or Firm* — Lerner, David, Littenberg, Krumholz & Mentlik, LLP

(57) ABSTRACT

A personal identification device compares personal identification dictionary data, which is generated from feature data extracted from an identification element for identifying a person and is stored in association with person-specifying information for specifying a person, against feature data extracted from an identification element extracted from a person to thereby identify a person having the captured identification element. The personal identification device includes a dictionary data update processing section that assigns a weighting factor, which is generated from capture time information newly acquired by a time acquiring section and capture time information of an identification element acquired previously and stored in a dictionary-data generating information storing section in association with person-specifying information, to feature data captured at each capture time to thereby generate or update identification dictionary data corresponding to person-specifying information acquired by a person-specifying section on the basis of the result of personal identification.

18 Claims, 15 Drawing Sheets

SET WEIGHTING FACTOR NON-LINEARLY IN IMAGING ORDER

SET WEIGHTING FACTOR IN ACCORDANCE WITH IMAGING INTERVAL (SECTION)

SET WEIGHTING FACTOR IN ACCORDANCE WITH IMAGING INTERVAL (TIME DIFFERENCE FROM PREVIOUS IMAGE)

$$FRDi = \frac{\sum_{n=1}^{N}(Wi,n \times Vi,n)}{\sum_{n=1}^{N} Wi,n} \quad \cdots (\text{FORMULA 4})$$

$$FRDi = \frac{\sum_{n=1}^{N} Vi,n}{\sum_{n=1}^{N} Wi,n} \quad \cdots (\text{FORMULA 5})$$

PERSONAL IDENTIFICATION DEVICE, PERSONAL IDENTIFICATION METHOD, UPDATING METHOD FOR IDENTIFICATION DICTIONARY DATA, AND UPDATING PROGRAM FOR IDENTIFICATION DICTIONARY DATA

CROSS-REFERENCE TO RELATED APPLICATIONS

The present application claims priority from Japanese Patent Application No. JP 2006-313735, filed in the Japanese Patent Office on Nov. 21, 2006, the entire content of which is incorporated herein by reference.

BACKGROUND OF THE INVENTION

1. Field of the Invention

The present invention relates to a personal identification device and a personal identification method which identify a person by using an identification element for identifying a person, such as a person's face image or voice. The present invention also relates to an updating method for identification dictionary data in a personal identification device, and an updating program for identification dictionary data which is used in a personal identification device.

2. Description of the Related Art

For example, there is known a personal identification method in which feature data of an identification element, such as the face, voice, or fingerprint of each of a plurality of persons to be identified, is stored as dictionary data in advance, and feature data of the above-mentioned identification element captured from a person to be identified is compared against the feature data of the identification element stored as dictionary data to thereby identify whose identification element the captured identification element of a person is.

According to this personal identification method, with a face image taken as an example of identification element, the above-mentioned face image of a person to be identified is captured, and dictionary data is generated by using feature data extracted from the captured face image. In this case, in order to average out errors in capturing in terms of the imaging conditions or face orientation at the time of capturing a face image serving as an identification element, it is common to capture a plurality of face images for the same person, and store averaged feature data as dictionary data for identifying that person (see Japanese Unexamined Patent Application Publication NO. 2003-271958).

Normally, when face image identification is performed anew for each individual person, the feature data of the face image of the person thus identified is reflected in identification dictionary data, thereby updating dictionary data of face image of each individual person.

In this case, according to the related art, dictionary data is generated and updated assuming that all captured face images have equal weight. That is, according to the related art, feature data of previously captured face images and newly captured feature data are all equally averaged in updating identification dictionary data. For example, newly captured feature data is added to identification dictionary data, and the added result is divided by the total number of times feature data has been captured to thereby calculate a simple average, and the thus averaged feature data is used as new identification dictionary data.

SUMMARY OF THE INVENTION

Generally speaking, the face image or voice of a person changes over time. Therefore, when using the face image or voice of a person as an identification element for identifying a person, changes in the face image or voice of a person over time should be taken into account.

According to the simple averaging technique of the related art, identification dictionary data is updated by using the latest feature data of an identification element such as a face image or voice at all times. Therefore, it can be said that the influence of changes in identification element over time is taken into account to some extent.

Since the method of the related art is a simple averaging method as described above, if the number of times an identification element has been captured in the past is large, the latest, that is, the current identification element such as a face image or voice is divided by the total number of times of capture and thus its contribution ratio becomes very small, leading to a problem in that not much improvement in identification accuracy can be expected. Another problem with the method of updating identification dictionary data by simple averaging according to the related art is that frequent updates result in too much averaging, which may dilute personal features in dictionary data.

It is thus desirable to improve the accuracy of dictionary data for personal identification.

According to an embodiment of the present invention, there is provided a personal identification device including: a dictionary data storing section that stores identification dictionary data for a person to be identified, which is generated from feature data extracted from an identification element for identifying the person, in association with person-specifying information for specifying the person; identification means for comparing feature data extracted from an identification element extracted from the person, against the identification dictionary data in the dictionary data storing section to identify a person who has the captured identification element; time acquiring means for acquiring information on capture time of an identification element captured from the person; person-specifying means for obtaining the person-specifying information that specifies a person who has the captured identification element, on the basis of a result of identification of the person by the identification means; dictionary-data generating information storing means for adding and storing data of the captured identification element or feature data extracted from the identification element, and time information acquired by the time acquiring means into the dictionary-data generating information storing section, in association with the person-specifying information acquired by the person-specifying means; and dictionary data update processing means for generating or updating the identification dictionary data corresponding to the person-specifying information acquired by the person-specifying means, by using information on capture time newly acquired by the time acquiring means, information on capture time of the identification element acquired previously and stored in the dictionary-data generating information storing section in association with the person-specifying information acquired by the person-specifying means, and feature data captured at each capture time, the dictionary data update processing means being configured to update the identification dictionary data by weighting each piece of the feature data by a weighting factor according to its capture time.

With the personal identification device according to the above-described embodiment of the present invention, on the basis of the capture times (acquisition times) of identification elements acquired from a person to be identified, feature data extracted from each identification element is weighted, and identification dictionary is updated by using the weighted feature data. Therefore, for example, by giving greater weight to more recent feature data, identification dictionary data which can be expected to provide improved personal identification accuracy can be obtained by performing the above update.

According to the present invention, accurate identification dictionary data can be obtained by updating, thereby improving the accuracy of personal identification.

DESCRIPTION OF THE PREFERRED EMBODIMENTS

Hereinbelow, a personal identification device according to an embodiment of the present invention will be described with reference to the drawings while taking as an example a device that performs personal identification by using a face image as an identification element for identifying a person.

Figure 1:
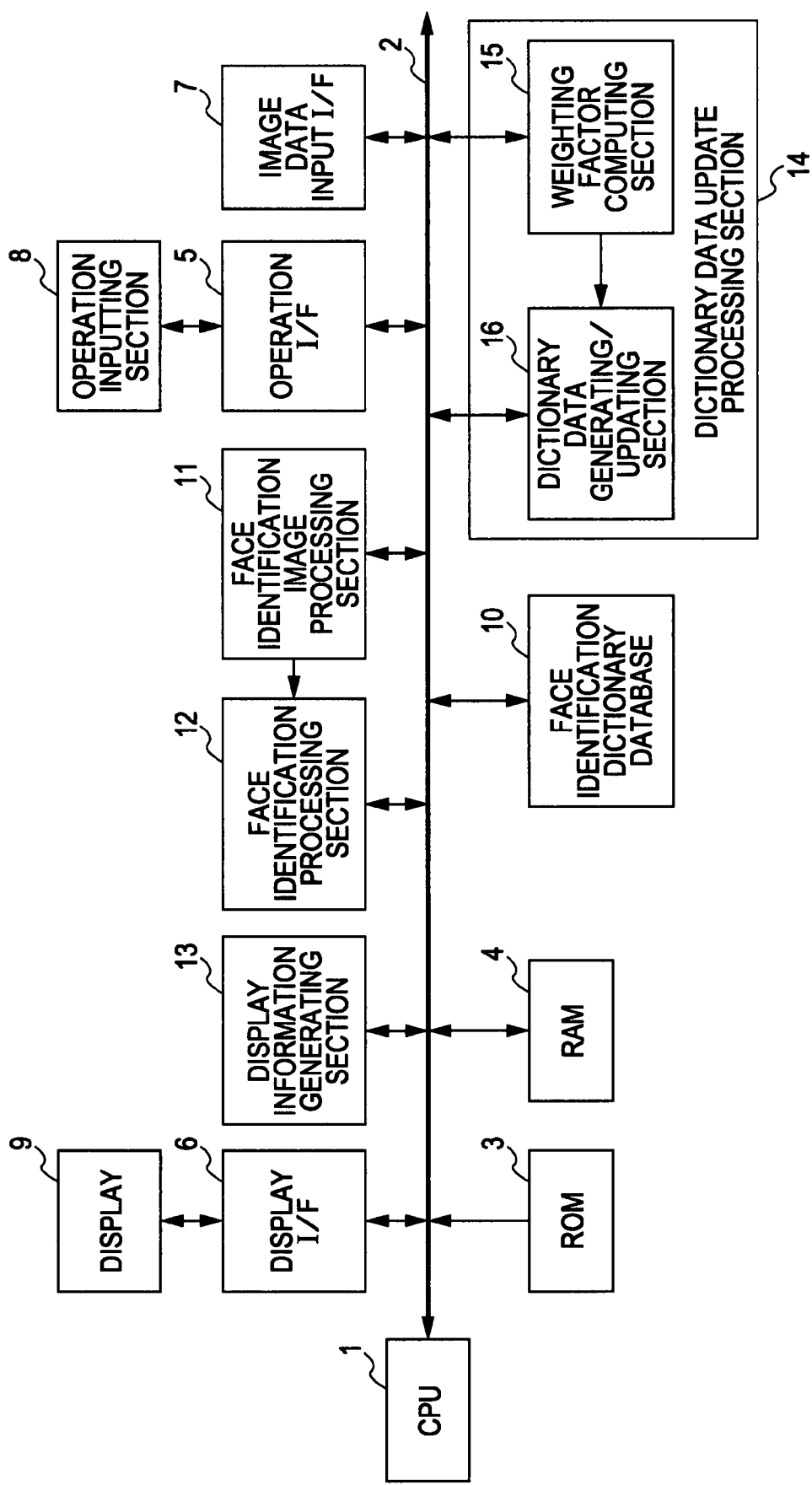
FIG. 1 is a block diagram showing an example of hardware configuration of a personal identification device according to an embodiment of the present invention.

FIG. 1 is a block diagram showing an example of the configuration of the personal identification device based on face images according to this embodiment. In the example shown in FIG. 1, a personal identification device based on face images is configured in, for example, a personal computer. Part of the components indicated by blocks can be configured by software as well.

As shown in FIG. 1, in the personal identification device based on face images according to this embodiment, a ROM (Read Only Memory) 3 storing programs or the like, a work area RAM (Random Access Memory) 4, an operating section interface 5, a display interface 76, and an image data inputting interface 7 are connected to a CPU (Central Processing Unit) 1 via a system bus 2.

An operation inputting section 8 such as a keyboard or mouse is connected to the operating section interface 5. A display 9 formed by an LCD (Liquid Crystal Display), for example, is connected to the display interface 6.

In a case where the image data inputting interface 7 receives image data from an image outputting device such as an imaging camera including a USB (Universal Serial Bus), for example, the image data inputting interface 7 is configured by a USB terminal and a USB interface.

In a case where the image data inputting interface 7 receives image data from a card-type memory in which image data is stored, the image data inputting interface 7 is configured by a memory reader in which this card-type memory is loaded.

In a case where the image data inputting interface 7 receives image data from an optical disk in which image data is stored, the image data inputting interface 7 is configured by an optical disk drive capable of reading image data from this optical disk.

It should be noted that the image data inputting interface 7 captures not only image data but also information accompanying image data, including, for example, imaging time information and imaging conditions (for example, information of the Exif (Exchange image file format) format).

In this case, although not shown, if imaging time information is not included in the image data captured via the image data inputting interface 7, the CPU 1 displays on the display 9 a message that urges the user to input imaging time because no imaging time information exists, so that the imaging time information inputted by the user in response to this message is acquired in association with the captured image data.

In this embodiment, a face identification dictionary database 10, a face identification image processing section 11, a face identification processing section 12, a display information generating section 13, and a dictionary data update processing section 14 are connected to the system bus 2. The dictionary data update processing section 14 includes a weighting factor computing section 15, and a dictionary data generating/updating section 16.

The face identification dictionary database 10 is configured by the entirety or part of the storage area of a storage such as a hard disk. In this embodiment, personal dictionary data Di for each of a plurality of individual persons Pi (i=1, 2, . . . the same applies hereinafter; i corresponds to a personal number) registered for personal identification based on face images is stored and retained in the face identification dictionary database 10 in association with person-specifying information (person-identifying ID or the like) for identifying each individual person. In the following description, the term "face identification" is synonymous with "personal identification based on face images".

Figure 2:
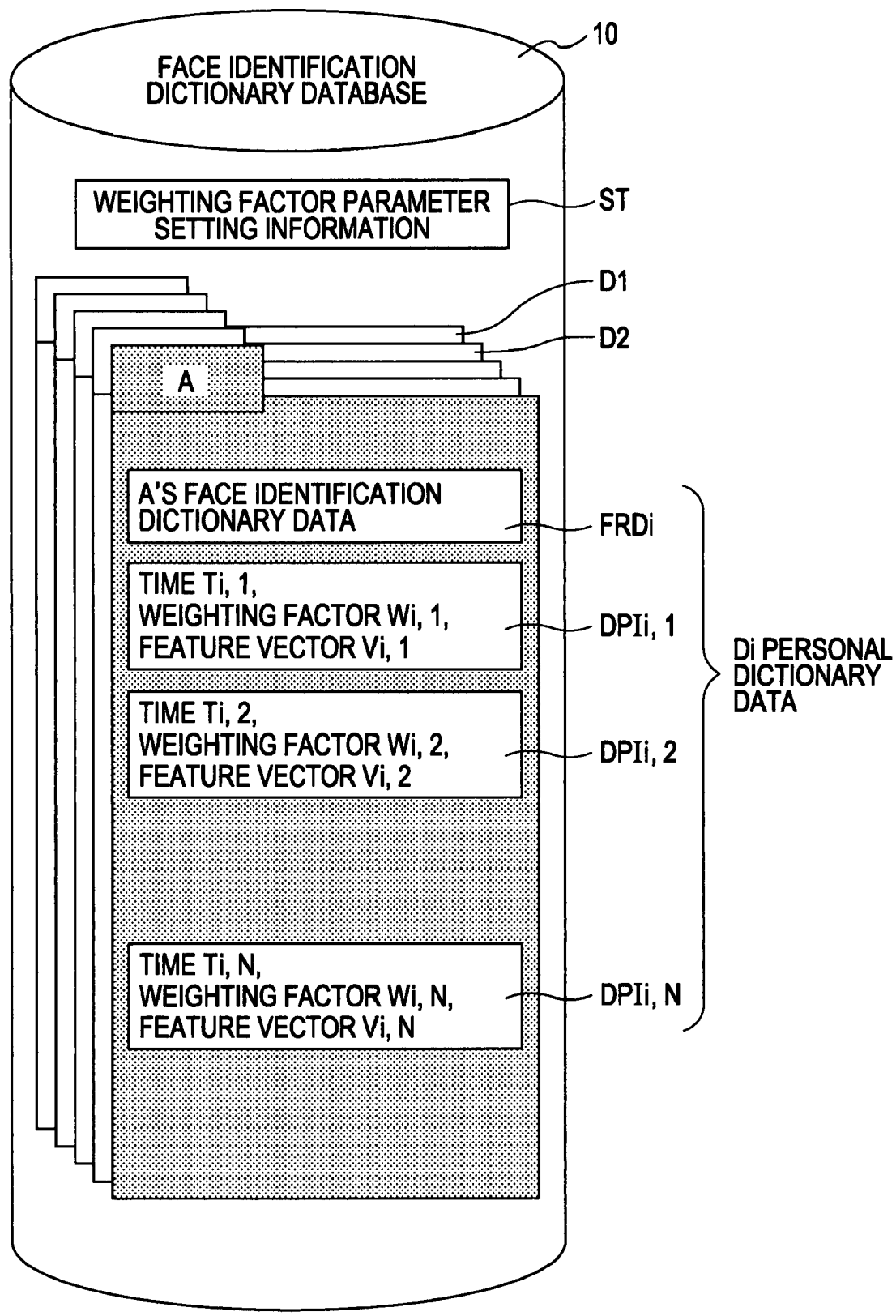
FIG. 2 is a diagram illustrating an example of contents stored in a face identification dictionary database according to an embodiment of the present invention.

As shown in FIG. 2, in this embodiment, personal dictionary data Di for a single person includes face identification dictionary data FRDi, and 1 or more, n (n=1, 2, . . . , N) pieces of dictionary-data generating information DPIi,n, and is stored and retained in association with person-specifying information. In this embodiment, personal names (first and last names) are registered as the person-specifying information. As the person-specifying information, not only personal names (first and last names) but also personal identification numbers or symbols or other such personal information may be used, or a combination of those pieces of information for identifying persons may be used.

In this embodiment, as personal dictionary data Di, a maximum of N, for example, 40 pieces of dictionary-data generating information can be accumulated per person. This is set by taking the storage capacity used by the dictionary database into account. Further, in this embodiment, the personal dictionary data Di to be accumulated is updated so as to leave, of data to be accumulated as personal dictionary data Di, the latest N pieces of data at all times.

In this example, the dictionary-data generating information DPIi,n includes information related to n (n=1 to N, N being the maximum) face images that are captured at different points in time with respect to a single person Pi to be subjected to face identification. In this embodiment, as shown in FIG. 2, this dictionary-data generating information DPIi,n includes time information Ti,n, feature data Vi,n of a captured face image, and a weighting factor i, n for the feature data Vi,n which is used for updating face identification dictionary data by using the feature data Vi,n of the captured face image. Detailed description of the weighting factor Wi,n will be given later.

The face identification dictionary data FRDi is feature data (feature vector) that is generated or updated using feature data (feature vector) for a face image stored as a part of dictionary-data generating information DPIi,n with respect to the i-th person Pi, and is dictionary data with respect to that person Pi which is used at the time of face identification processing with respect to a face image captured for face identification.

In this embodiment, as described later, face identification dictionary data FRDi for each person Pi is generated in the manner as described later by using weighted data, which is obtained by weighting feature data (feature vector) of each dictionary-data generating information DPIi,n stored in the face identification dictionary database 10 in association with that person Pi by a weighting factor for that feature data.

Further, in this embodiment, as described later, a plurality of computing methods are made available as the computing method (setting method) for the weighting factor Wi,n, allowing the user to select one from among the plurality of available computing methods for the weighting factor Wi,n. Further, as information for specifying the selected weighting factor computing method, weighting-factor parameter setting information ST is stored in the face identification dictionary database 10.

While the weighting factor computing method may be selected and set for each personal dictionary data Di of a person to be identified, in this embodiment, one weighting factor computing method is selected and set for the face identification dictionary database 10 as a whole.

Figure 3:
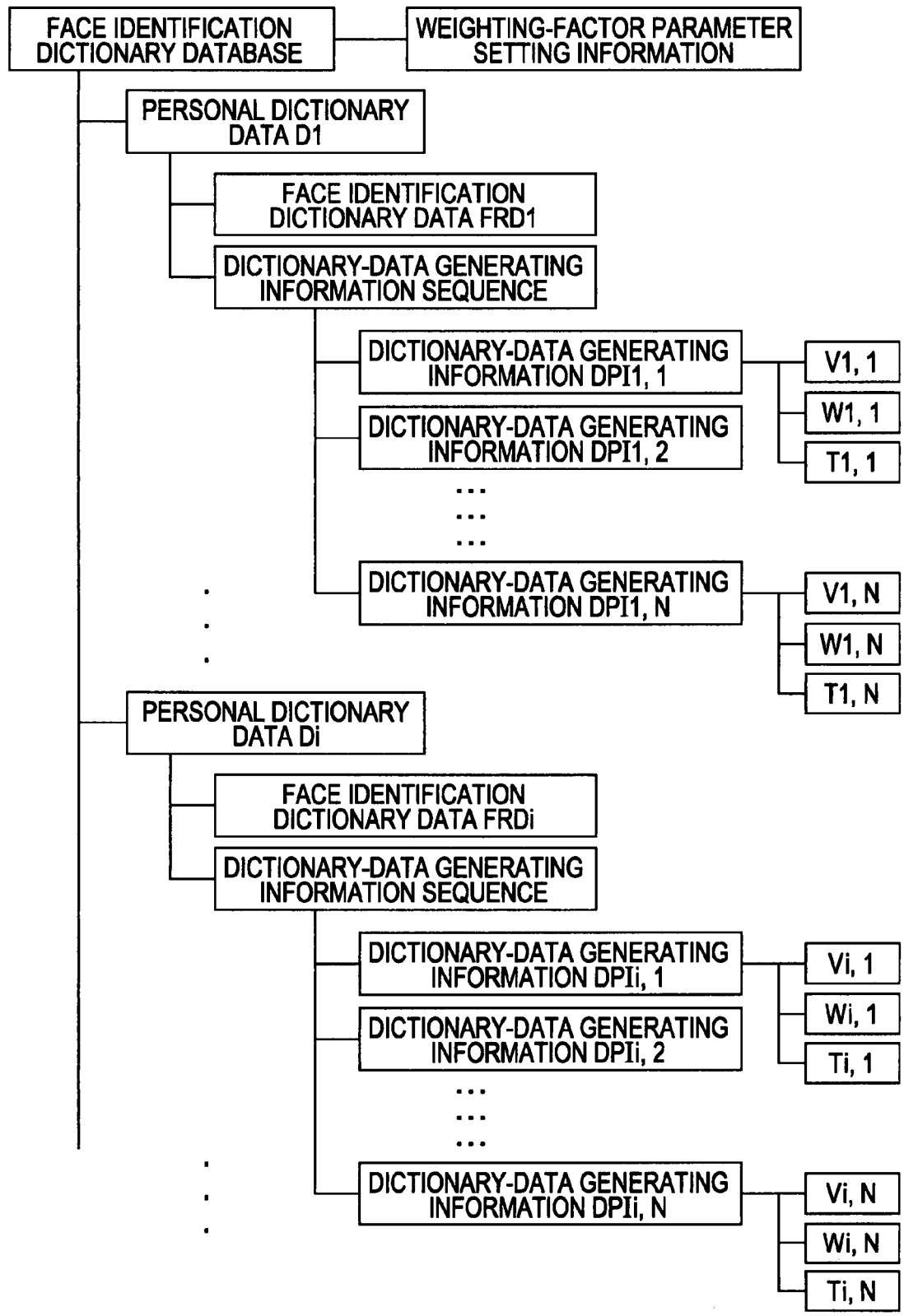
FIG. 3 is a diagram illustrating an example of the format of contents stored in a face identification dictionary database according to an embodiment of the present invention.

FIG. 3 is a diagram illustrating the format of data stored in the face identification dictionary database 10.

That is, in this embodiment, as shown in FIG. 3, weighting-factor parameter setting information for specifying one weighting factor computing method is stored for the face identification dictionary database 10 as a whole.

The face identification dictionary database 10 includes personal dictionary data Di (i=1, 2, . . . ) for a plurality of persons. Each personal dictionary data Di includes face identification dictionary data FRDi for the corresponding person Fi, and dictionary-information generating information sequence. As described above, the dictionary-information generating information sequence includes n (n=1 to N, N being the maximum) pieces of dictionary-data generating information DPIi,n. Further, each dictionary-data generating information DPIi,n includes feature data (feature vector) Vi,n, imaging time information Ti,n, and a weighting factor Wi,n.

Figure 4:
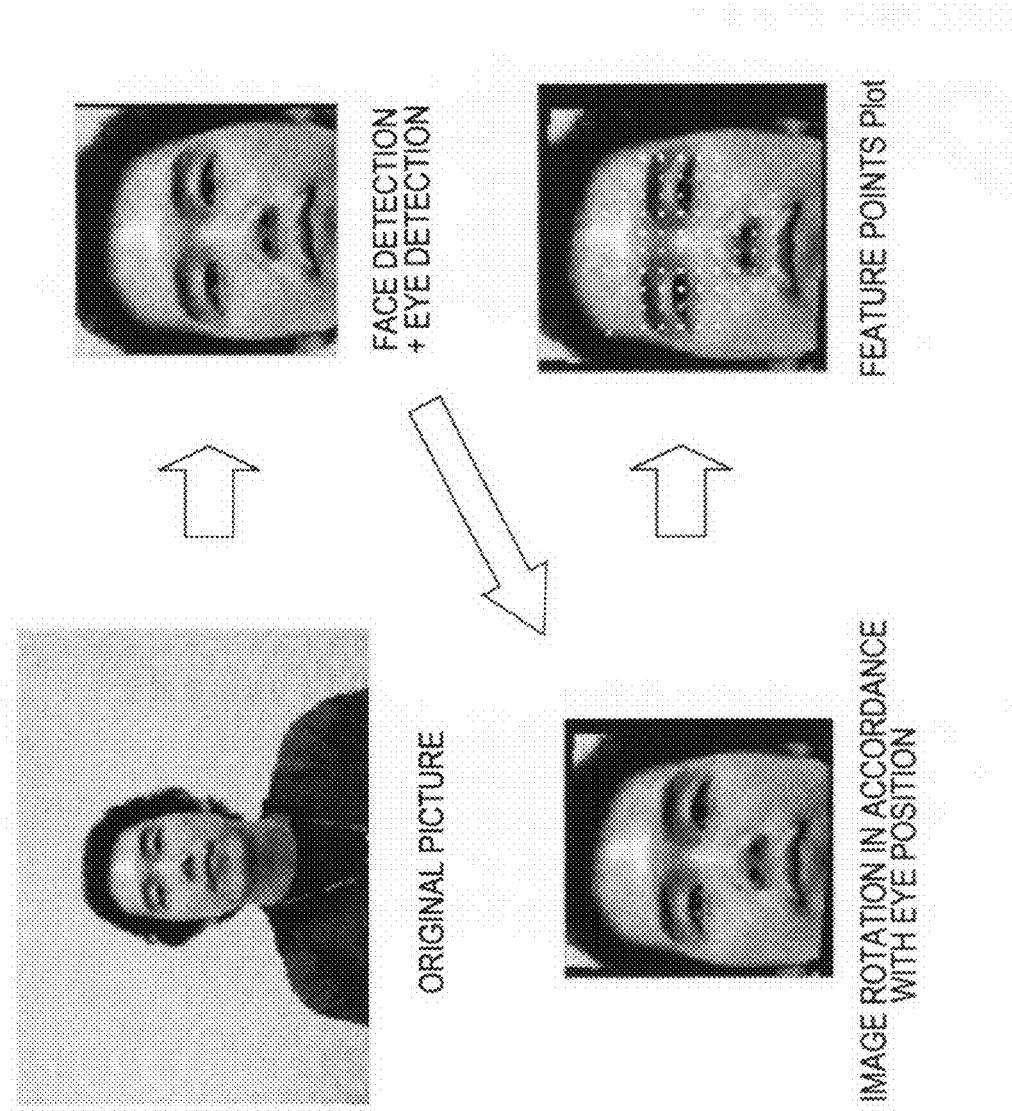
FIG. 4 is a view illustrating an example of face identification processing in a personal identification device according to an embodiment of the present invention.

Next, as shown in FIG. 4, the face identification image processing section 11 performs face detection and eye detection from the image data of an original picture captured via the image data inputting interface 7, and rotates the face image in accordance with the eye position so as to make the detected positions of both eyes horizontal. The reason why the face image is rotated in accordance with the eye position is that, as described later, a face image that faces the front with both eyes being horizontal is used as a reference for face identification.

Further, the face identification image processing section 11 carries out feature point plotting (feature points sampling) for extracting feature data of feature parts (for example, the eyebrow, eyes, nose, and mouth) for identifying a face image, thus acquiring a feature vector Vin as feature data with respect to the captured face image Fin. In this case, the feature vector Vin is represented as a function with a plurality of kinds of feature quantity taken as variables.

It should be noted that since processing such as face detection, eye detection, and computation of the feature vector Vin in the face identification image processing section 11 is described in detail in Japanese Unexamined Patent Application Publication No. 2006-72770, Japanese Unexamined Patent Application Publication No. 2005-44330, and "Learning of Real-Time, Random Posture Face Detector using Pixel Difference Feature", Koutaro Sabe, Kenichi Hidai, Technical Digest of the 10th Image Sensing Symposium, pp. 547-552, June 2004), detailed description thereof is omitted here.

The face identification image processing section 11 supplies to the face identification processing section 12 the feature vector Vin serving as feature data acquired with respect to the captured face image Fin.

If face detection or eye detection did not succeed, or if face detection or eye detection succeeded but feature vector computation did not succeed in the face identification image processing section 11, the face identification image processing section 11 sends an indication to that effect to the face identification processing section 12 or the display information generating section 13.

The face identification processing section 12 receives the feature vector Vin as feature data of the face image Fin acquired from the captured image from the face identification image processing section 11, and compares and verifies this feature vector Vin against the face identification dictionary data (feature vector) FRDi of a plurality of persons stored in the face identification dictionary database 10, thus detecting the face identification dictionary data FRDi that can be determined as matching.

Then, if the face identification processing section 12 succeeded in detecting face identification dictionary data FRDi that can be determined to be a match, the face identification processing section 12 sends an indication to that effect, and person-specifying information corresponding to the successfully detected face identification dictionary data FRDi, which in this example is the first and last name of a person, to the display information generating section 13.

If the face identification processing section 12 did not succeed in detecting face identification dictionary data FRDi that can be determined as a match, the face identification processing section 12 sends an indication to the effect to the display information generating section 13.

It should be noted that the face identification processing section 12 does not execute the above-described face identification processing if it receives from the face identification image processing section 11 an indication that face detection and eye detection did not succeed, or an indication that face detection or eye detection succeeded but feature vector computation did not succeed.

Figure 5:
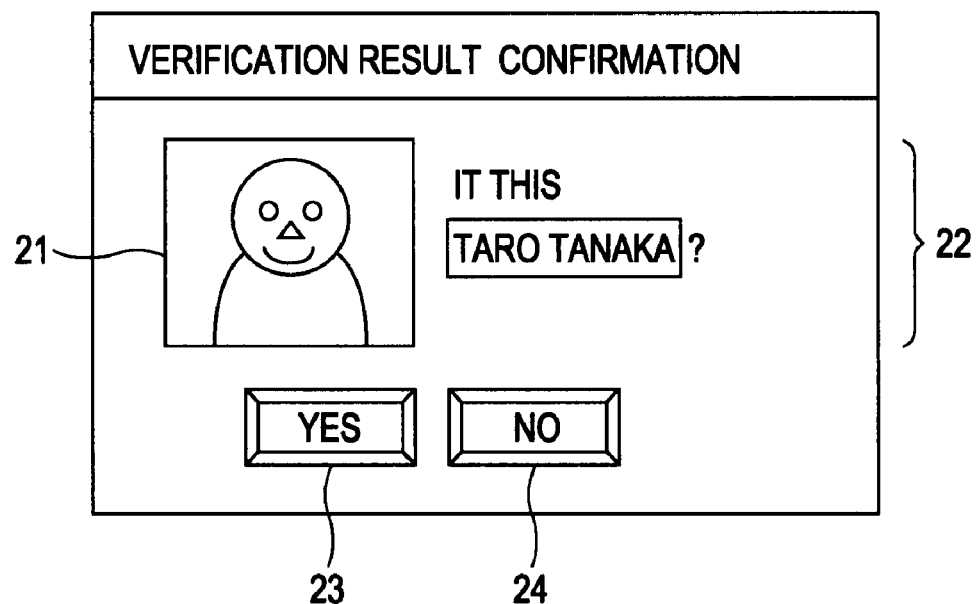
FIG. 5 is a view illustrating an example of face identification processing in a personal identification device according to an embodiment of the present invention.

When the display information generating section 13 receives from the face identification processing section 12 an indication of success of face identification, and a person's first and last name serving as person-specifying information as a result of face identification, the display information generating section 13 generates the display information of a face identification result confirmation screen as shown in FIG. 5 for making the user confirm the result of face identification, and causes the display information to be displayed on the screen of the display 9 via the display interface 6.

As shown in FIG. 5, this face identification result confirmation screen displays a display image 21 of a captured face image Fin, as well as an inquiry message 22 "is this " . . . "?" inquiring the user whether or not the face identification result is correct, and answer button icons 23, 24 with respect to the inquiring message 22. A first and last name as a face identification result is displayed in the " . . . " portion of the inquiring message 22.

In the example of FIG. 5, since the feature data of a captured face image has been determined by the face identification processing section 12 to be matching the feature data (face identification dictionary data FRDi) of the face image of the personal dictionary data Di of "Taro Tanaka", "Taro Tanaka" is displayed in the " . . . " portion of the inquiring message 22.

The answer button icon 23 is a positive answer button, and the answer button icon 24 is a negative answer button.

In the screen shown in FIG. 5, when the user clicks on the positive answer button 23 by using the operation inputting section 8, the display information generating section 13 supplies first and last name information as a face identification result to the dictionary data update processing section 14 in accordance with control of the CPU 1. As described later, the dictionary data update processing section 14 generates or updates personal dictionary data Di stored in the face identification dictionary database 10, in association with the person-specifying information specified by the received first and last name.

Figure 6:
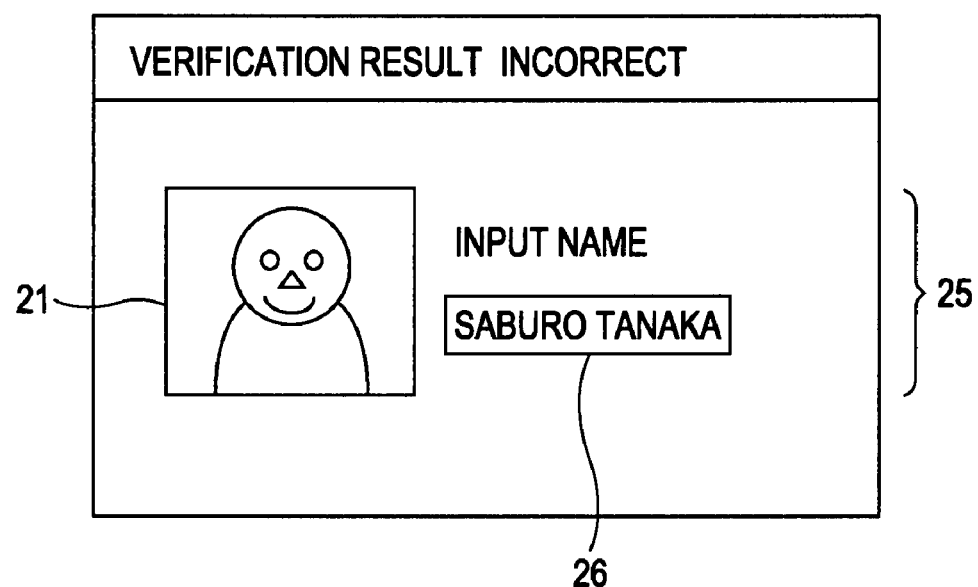
FIG. 6 is a view illustrating an example of face identification processing in a personal identification device according to an embodiment of the present invention.

Further, in the screen shown in FIG. 5, when the user clicks on the negative answer button 24 by using the operation inputting section 8, the display information generating section 13 generates display information of a face identification result incorrect screen as shown in FIG. 6 informing the user of the fact that the face identification result is incorrect, and causes the display information to be displayed on the screen of the display 9 via the display interface 6.

As shown in FIG. 6, this face identification result incorrect screen displays the display image 21 of a captured face image Fin, and a message 25 urging input of first and last name to specify whose face image the captured face image Fin is. The user inputs into a first and last name input field 26 within the message 25 the first and last name of the person being displayed as the display image 21.

Upon accepting the user's input of first and last name, the display information generating section 13 supplies the inputted first and last name information to the dictionary data update processing section 14. As described later, the dictionary data update processing section 14 performs processing of generating or updating personal dictionary data Di which is stored in the face identification dictionary database 10 in association with person-specifying information including the received first and last name.

It should be noted that when termination of face identification processing is instructed from the user with no first and last name inputted into the first and last name input field 26, first and last name information is not transmitted from the display information generating section 13, and a notification indicating that no dictionary updating is to be made is transmitted to the dictionary data update processing section 14 in accordance with control of the CPU 1. The dictionary data update processing section 14 thus does not perform generation or updating of dictionary data.

Figure 7:
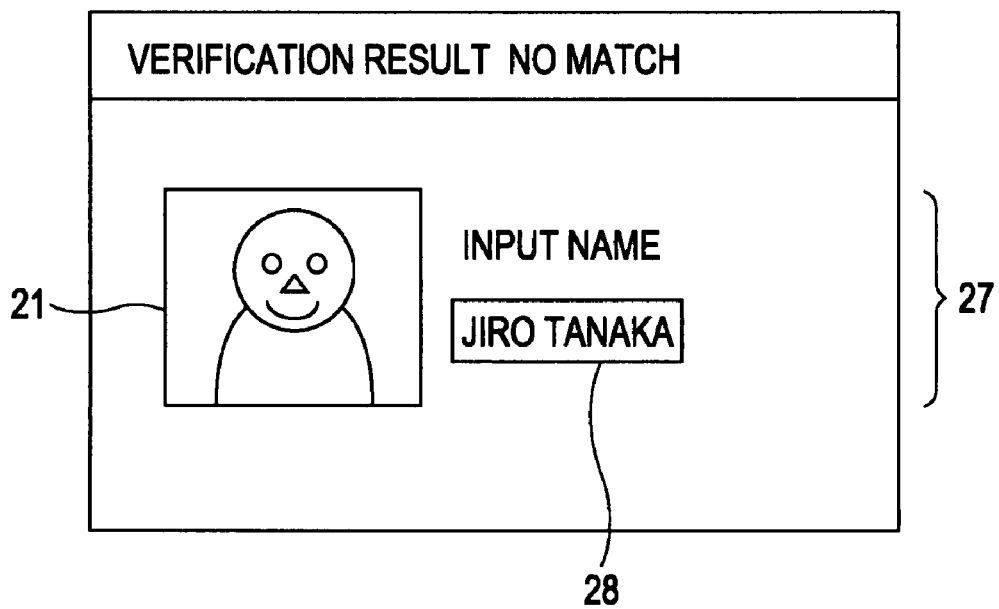
FIG. 7 is a view illustrating an example of face identification processing in a personal identification device according to an embodiment of the present invention.

When the display information generating section 13 receives as a face identification result from the face identification processing section 12 a notification indicating that dictionary data matching a captured face image does not exist within the dictionary database 10, the display information generating section 13 generates a face identification result no match screen as shown in FIG. 7 for informing the user of "no match" as the face identification result, and causes the display information to be displayed on the screen of the display 9 via the display interface 6.

As shown in FIG. 7, this face identification result no match screen displays the display image 21 of a captured face image Fin, and a message 27 urging input of first and last name to specify whose face image the captured face image Fin is. The user inputs into a first and last name input field 28 within the message 27 the first and last name of the person being displayed as the display image 21.

Upon accepting the user's input of first and last name, the display information generating section 13 supplies the inputted first and last name information to the dictionary data update processing section 14. As described later, the dictionary data update processing section 14 performs processing of generating or updating personal dictionary data Di with the received first and last name as person-specifying information.

It should be noted that when termination of face identification processing is instructed from the user with no first and last name inputted into the first and last name input field 28, first and last name information is not transmitted from the display information generating section 13, and a notification indicating that no dictionary updating is to be performed is transmitted to the dictionary data update processing section 14 in accordance with control of the CPU 1. The dictionary data update processing section 14 thus does not perform generation or updating of dictionary data.

Figure 8:
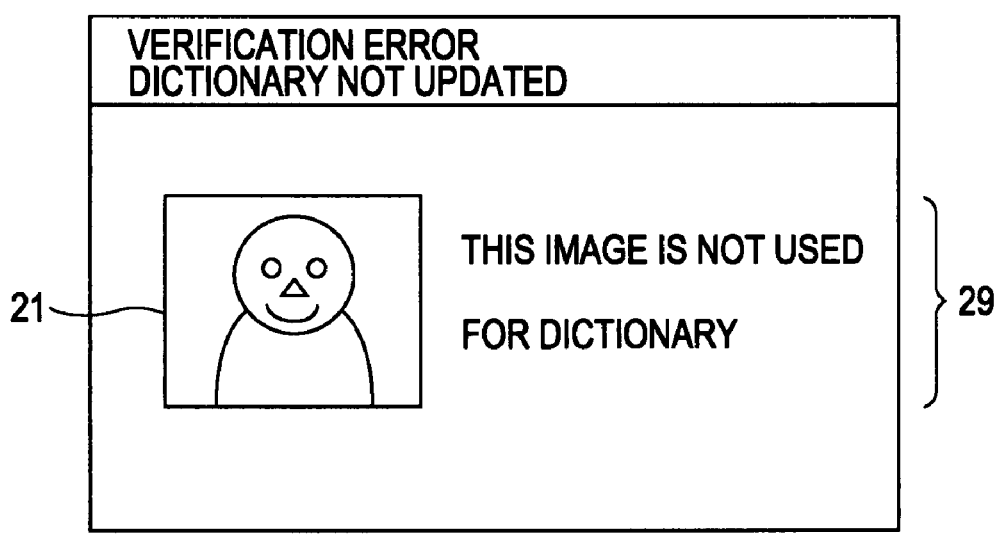
FIG. 8 is a view illustrating an example of face identification processing in a personal identification device according to an embodiment of the present invention.

When the display information generating section 13 receives from the face identification image processing section 11 a notification indicating that face detection or eye detection or, ultimately, feature vector computation did not succeed, the display information generating section 13 generates display information of a verification error notification screen as shown in FIG. 8, and causes the display information to be displayed on the screen of the display 9 via the display interface 6.

As shown in FIG. 8, this verification error notification screen displays a message 29 stating that a captured face image is not to be used for dictionary updating. Then, in accordance with control of the CPU 1, the display information generating section 13 notifies the dictionary data update processing section 14 that no dictionary updating is to be performed.

In this embodiment, when person-specifying information is specified on the basis of the result of identification by the face identification processing section 13, the dictionary data update processing section 14 executes updating of personal dictionary data Di corresponding to this person-specifying information.

In this case, as will be appreciated from the above description, cases "when person-specifying information is specified on the basis of the result of identification by the face identification processing section 13" include a case in which the face identification result is correct and person-specifying information is specified with a personal identification device, a case in which the face identification result is incorrect and person-specifying information is specified by a first and last name of a person inputted by the user, and a case in which no matching information was found as a result of face identification and a new face image is captured, and in which person-specifying information is specified by a first and last name of a person inputted by the user.

When the dictionary data update processing section 14 receives a notification that face detection or eye detection or, ultimately, feature vector computation did not succeed in the face identification image processing section 11, the dictionary data update processing section 14 does not perform updating of the personal dictionary data Di mentioned above. The dictionary data update processing section 14 does not perform updating of the personal dictionary data Di mentioned above also when specification of person-specifying information with respect to a captured face image did not finally succeed.

In this embodiment, when executing updating of personal dictionary data Di corresponding to specified person-specifying information in the face identification dictionary database 10, the dictionary data update processing section 14 first refers to the number of pieces of dictionary-data generating information DPIi,n included in the above-mentioned personal dictionary data Di. If the number is smaller than N that is the maximum number, the dictionary data update processing section 14 adds and stores the feature vector Vin of a newly acquired face image, and imaging time information of the face image into the personal dictionary data Di as the latest dictionary-data generating information.

Further, if the number of pieces of dictionary-data generating information DPIi,n included in personal dictionary data Di corresponding to the person-specifying information to be updated is the maximum number N, then the dictionary data update processing section 14 discards the earliest dictionary-data generating information DPIi,1 from among the dictionary-data generating information DPIi,n at that time, and also sequentially lowers the time order of each dictionary-data generating information DPIi,n as follows:

$$DPIi,n \rightarrow DPIi,n-1$$

Then, the feature vector Vin of a newly captured face image, and imaging time information thereof ate stored as the latest dictionary-data generating information DPIi,N, thereby updating personal dictionary data Di. Since a weighting factor has not been computed at this point, the previously stored weighting factor remains as it is.

A weighting factor is computed and stored with respect to at least the latest dictionary-data generating information DPIi,N by using imaging time information included in the personal dictionary data Di updated as described above. As described later, depending on the case, a weighting factor with respect to another dictionary-data generating information originally stored as the personal dictionary data is updated in accordance with the selected weighting factor computing method or used as it is without being updated.

The dictionary data update processing section 14 passes weighting factor parameter setting information ST to the weighting factor computing section 15 and, as described later, designates the weighting factor computing method to be executed by the weighting factor computing section 15. At the same time, the dictionary data update processing section 14 passes imaging time information Ti,N of the latest dictionary-data generating information DPIi,N and necessary past dictionary-data generating information DPIi,n to the weighting factor computing section 15, and instructs weighting factor computation.

In this embodiment, when person-specifying information is specified on the basis of the result of identification by the face identification processing section 13, the weighting factor computing section 15 computes the weighting factor with respect to a feature vector, which is used in updating the face identification dictionary data FRDi of the personal dictionary data Di corresponding to this person-specifying information, by using the latest imaging time information and past imaging time information.

As described above, in the personal identification device according to this embodiment, a plurality of, in this example, four kinds of computing method are available as the computing method (setting method) for this weighting factor. Which one of the four kinds of weighting factor computing method is to be used is selected and set by the user, and the selection/setting information is stored into the face identification dictionary database 10.

Figure 9:
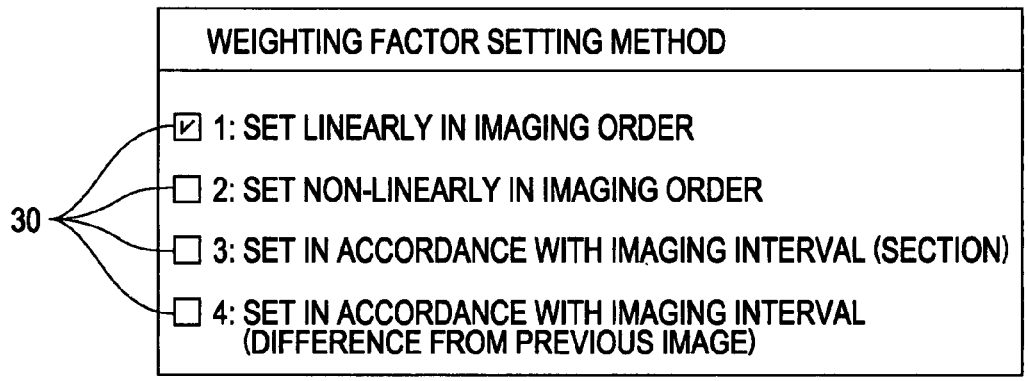
FIG. 9 is a view illustrating the setting and selection of a weighting factor computing method in a personal identification device according to an embodiment of the present invention.

In this embodiment, when the user designates "selection of weighting-factor setting method" from the setting menu, for example, via the operation inputting section 8, the "weighting-factor setting method selecting screen" as shown in FIG. 9 is displayed on the display 9.

As shown in FIG. 9, in this embodiment, the following four kinds of weighting factor computing method (setting method) are displayed as a list of weighting factor computing method candidates that can be selected and set:

(1) Set a weighting factor linearly in the imaging order;

(2) Set a weighting factor non-linearly in the imaging order;

(3) Set a weighting factor in accordance with the imaging interval (section); and (4) Set a weighting factor in accordance with the imaging interval (time difference from the previous image). Details of each computing method will be described later.

As shown in FIG. 9, in this example, a check-mark entry field 30 for user's selection/setting is provided at the head of each weighting factor computing method candidate. By clicking on the check-mark entry field 30 provided at the top of desired weighting factor computing method candidate with a pointing device such as a mouse, the user can select and set this weighting factor computing method candidate as the weighting factor computing method to be used. The example of FIG. 9 shows a state in which "(1) Set a weighting factor linearly in the imaging order" is selected.

In this case, depending on the weighting factor computing method selected, there are a case where the weighting factor computing section 15 computes only the weighting factor with respect to the feature vector of a newly captured face image, and a case where the weighting factor computing section 15 not only computes the weighting factor with respect to the feature vector of a newly captured face image but also re-calculates weighting factors with respect to the feature vectors of previously captured face images stored in association with person-specifying information.

Next, description will be further given of each of the four kinds of weighting factor computing method employed in this embodiment.

First Example

Set Weighting Factor Linearly in Imaging Order
(Linear Computation Method)

Figure 10:
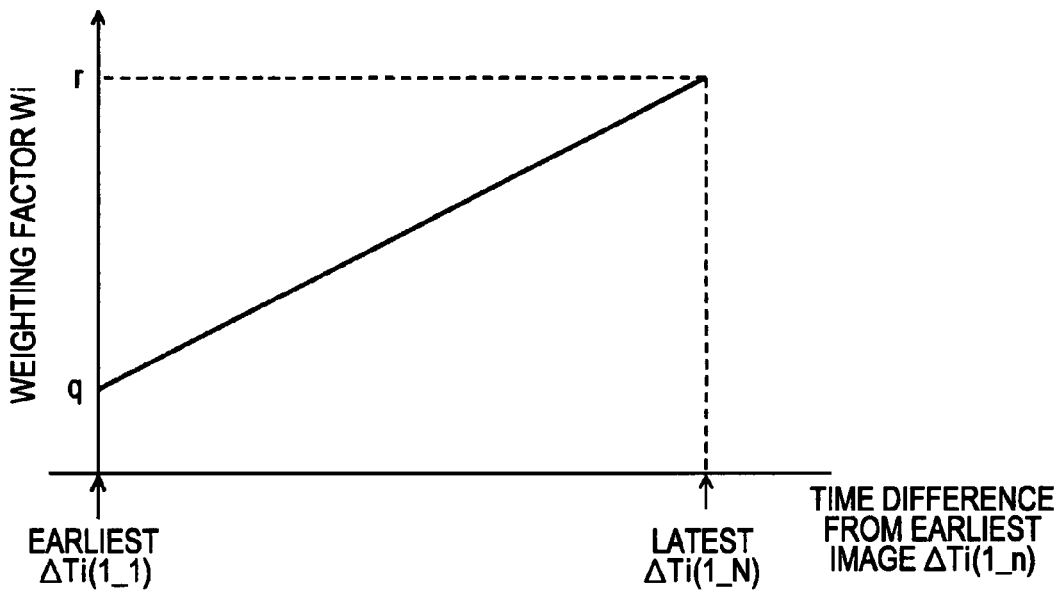
FIG. 10 is a diagram illustrating a first example of weighting factor computing method in a personal identification device according to an embodiment of the present invention.

FIG. 10 is a diagram illustrating a method of computing (setting) a weighting factor linearly in the imaging order. This weighting factor computing method will be hereinafter referred to as the linear computation method.

In the case where this linear computation method is adopted, as for the weighting factor with respect to the feature data of personal dictionary data Di stored in association with person-specifying information specified on the basis of identification using a newly captured face image, not only the weighting factor $Wi,New$ for the latest dictionary-data generating information $DPIi,New$ (when N pieces of dictionary-data generating information are stored, $DPIi,New=DPIi,N$), but all the weighting factors $Wi,n$ for previously captured and stored dictionary-data generating information $DPIi,n$ ($n=1, 2, \ldots$) are re-calculated and updated.

Accordingly, in the case where this linear computation method is adopted, the dictionary data update processing section 14 passes the imaging time information of all the pieces of updated dictionary-data generating information to the weighting-factor computing section 15.

Then, in this linear computation method, since the imaging time $Ti,1$ of the earliest dictionary-data generating information of the updated personal dictionary data Di is used as a reference in this embodiment, the weighting-factor computing section 15 first computes the time difference $\Delta Ti(1\_n)$ between the imaging time $Ti,n(n=1, 2, \ldots, New)$ of each dictionary-data generating information of the updated personal dictionary data Di, and the earliest imaging time $Ti,1$.

Then, as shown in FIG. 10, the weighting-factor computing section 15 computes the weighting factor $Wi,n$ by (Formula 1) below so that the weighting factor $Wi,n$ increases linearly as the computed time difference $\Delta Ti(1\_n)$ becomes larger.

That is, the weighting-factor computing section 15 computes the weighting factor $Wi,n$ with respect to each feature vector $Vi,n$ by the following formula:

$$Wi,n = p \times \Delta Ti(1\_n) + q \quad \text{(Formula 1)}$$

It should be noted that in FIG. 10, the time difference $\Delta Ti,1=0$, and the weighting factor $Wi,1$ at this time becomes the minimum value q of weighting factor set in advance. Further, when the maximum value of weighting factor set in advance is taken as r, the weighting factor $Wi,New$ at the time difference $\Delta Ti(1\_New)$ with respect to the latest imaging time is $Wi,New=r$.

Further, the gradient p of the straight line of the linear function shown in FIG. 10 is represented as follows:

$$p = (r-q)/(\Delta Ti(1\_New) - \Delta Ti(1\_1))$$

This corresponds to the difference ($\Delta Ti, New - \Delta Ti,1$) between the latest imaging time and the earliest imaging time of a plurality of pieces of updated dictionary-data generating information DPIi. This value is not constant but changes every time new data is captured.

Here, in a case where N pieces of dictionary-data generating information $DPIi,1$ to $DPIi,N$ are stored in the face identification dictionary database 10 in association with person-specifying information, the time difference $\Delta Ti(1\_New)$ is represented as follows:

$$\text{Time difference } \Delta Ti(1\_New) = \Delta Ti(1\_N) = Ti,N - Ti,1.$$

However, when only less than N pieces of dictionary-data generating information corresponding to person-specifying information are stored in the face identification dictionary database 10 even after addition of dictionary-data generating information, the imaging time of the latest one of the less than N pieces of dictionary-data generating information serves as the latest imaging time, and the time difference between that imaging time and the earliest imaging time $Ti,1$ serves as the time difference $\Delta Ti(1\_New)$ with respect to the latest imaging time.

In the above description, with the imaging time $Ti,1$ of the earliest dictionary-data generating information of the updated personal dictionary data Di taken as a reference, the time difference $\Delta Ti(1\_n)$ between this imaging time $Ti,1$ and the imaging time $Ti,n$ of each dictionary-data generating information is computed, and the weighting factor $Wi,n$ is set so as to increase linearly as the time difference $\Delta Ti(1\_n)$ becomes larger. However, the reference with respect to which a time difference is computed may be set as the latest imaging time $Ti,New$.

In that case, the weighting factor $Wi,New$ becomes the maximum value r at the time difference $\Delta T(New\_New) (=0)$, and linearly decreases as the time difference $\Delta T(New\_n)$ becomes larger. The weighting factor $Wi,1$ when the time difference from the earliest imaging time $Ti,1$ is $\Delta T(New\_1)$ becomes the minimum value q.

Second Example

Set Weighting Factor Non-Linearly in Imaging Order
(Non-Linear Computation Method)

Figure 11:
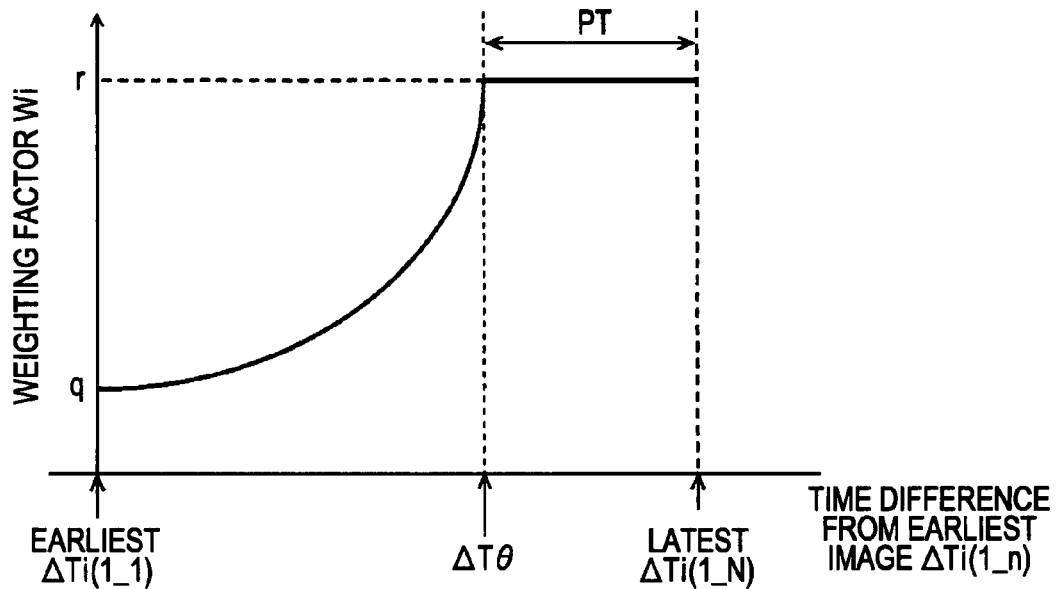
FIG. 11 is a diagram illustrating a second example of weighting factor computing method in a personal identification device according to an embodiment of the present invention.

FIG. 11 is a diagram illustrating a method of computing (setting) a weighting factor non-linearly in the imaging order. This weighting factor computing method will be hereinafter referred to as the non-linear computation method.

In the case where this non-linear computation method is adopted as well, as for the weighting factor with respect to the feature data of personal dictionary data Di stored in association with person-specifying information specified on the basis of identification using a newly captured face image, not only the weighting factor $Wi,New$ for the latest dictionary-data generating information $DPIi,New$ (when N pieces of dictionary-data generating information are stored, DPIi, New=DPIi,N), but all the weighting factors Wi,n for previously captured and stored dictionary-data generating information DPIi,n (n=1, 2, . . . ) are re-calculated and updated.

Accordingly, in the case where this non-linear computation method is adopted as well, the dictionary data update processing section 14 passes the imaging time information of all the pieces of updated dictionary-data generating information to the weighting-factor computing section 15.

Then, in this non-linear computation method as well, since the imaging time Ti,1 of the earliest dictionary-data generating information of the updated personal dictionary data Di is used as a reference in this embodiment, the weighting-factor computing section 15 first computes the time difference ΔTi(1_n) between the imaging time Ti,n(n=1, 2, . . . , New) of each dictionary-data generating information of the updated personal dictionary data Di, and the earliest imaging time Ti,1.

Then, as shown in FIG. 11, the weighting-factor computing section 15 computes the weighting factor Wi,n by (Formula 2) below so that the weighting factor Wi,n increases non-linearly as the computed time difference ΔTi(1_n) becomes larger.

That is, the weighting-factor computing section 15 computes the weighting factor Wi,n with respect to each feature vector Vi,n by the following formula:

If the time difference $\Delta Ti(1\_n) < \Delta T\theta, Wi,n = f(\Delta Ti(1\_n)) + q$, and if the time difference $\Delta Ti(1\_n) \geq \Delta T\theta, Wi,n = r$     (Formula 2)

f(ΔTi(1_n)) in (Formula 2) is a non-linear function with the time difference ΔTi(1_n) as a variable, and various kinds of curve function of a non-linear variation pattern can be used. The example shown in FIG. 11 uses a curve function in which smaller weighting factors are given to feature vectors of previous face images to keep their influence on face identification dictionary data low, and in which larger weighting factors are given to the feature vectors of more recent face images to increase their influence on face identification dictionary data.

As can be appreciated from FIG. 11 and (Formula 2), in the non-linear computation method according to this embodiment, a section PT of the time difference that is smaller than the time difference ΔTi,New corresponding to the latest imaging time Ti,New by a predetermined threshold time difference ΔTθ is set as a priority section, and the weighting factor Wi,n with respect to the time difference ΔT(1_n) included in this priority section PT is set to the maximum value r. That is, the maximum weighting factor is set for the feature vectors of recent face images, thereby increasing their influence on face identification dictionary data.

In this embodiment, the threshold time difference ΔTθ can be adjusted and set by the user. That is, in this embodiment, in a case where the second method, "Set non-linearly in the imaging order" is selected by the user on the weighting-factor setting method selection/setting screen shown in FIG. 9, when person-specifying information is specified, and it is determined by the CPU 1 to perform updating of the corresponding personal dictionary data Di, in accordance with control of the CPU 1, the display information generating section 13 generates a "priority section PT adjustment" screen for display on the display 9.

Figure 12:
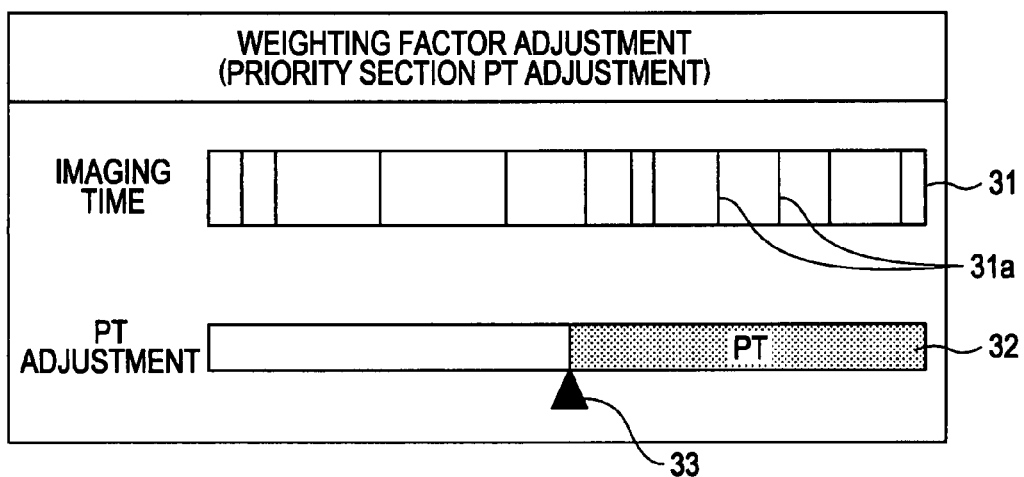
FIG. 12 is a diagram illustrating a second example of weighting factor computing method in a personal identification device according to an embodiment of the present invention.

As shown in FIG. 12, on this "priority section PT adjustment" screen, the sequence of imaging times included in individual pieces of updated dictionary-data generating information DPIi,n stored as the personal dictionary data Di to be updated is displayed in an imaging-time sequence field 31, and a priority section PT adjustment field 32 is provided so as to allow adjustment to be made in association with the imaging time sequence.

In the imaging-time sequence field 31, the horizontal direction is taken as the time direction, and individual imaging times are indicated by vertical lines 31a. In the priority section PT adjustment field 32, the time difference ΔT(1_n) from the earliest imaging time Ti,1 described above is displayed on a horizontal bar in association with the imaging time sequence field 31, with the horizontal direction taken as the time difference direction. In the priority section PT adjustment field 32, the user can set the priority section PT, that is, the threshold time difference ΔTθ while moving the position of an adjustment point mark 33 in the horizontal direction (time difference direction).

It should be noted that the priority section PT may be zero and hence not provided.

It should be noted that in this non-linear computation method as well, as in the linear computation method described above, a time difference may be computed with reference to the latest imaging time Ti,New, instead of the imaging time Ti,1 of the earliest dictionary-data generating information of the updated personal dictionary data Di.

In that case, the weighting-factor setting characteristic curve is equivalent to one obtained by reversing the characteristic curve shown in FIG. 11 line-symmetrically so that the latest time difference and the earliest time difference are reversed in their positions, with the time difference position intermediate between the latest time difference position and the earliest time difference position serving as a symmetric axis position.

In the above description, the setting of the priority section PT is performed after person-specifying information is specified and before weighting factor computation is performed. However, a configuration is also possible in which when the second method "Set non-linearly in the imaging order" is selected by the user on the weighting-factor setting method selection/setting screen shown in FIG. 9, the user can set the size of this priority section PT. In that case, it is not necessary for the user to reset the priority section PT every time the weighting factor is updated.

It should be noted that in the above-described linear computation method according to the first example as well, there may be provided the priority section PT in which, when the time difference ΔT(1_n) becomes equal to or larger than a predetermined time difference ΔTθ, the value of the corresponding weighting factor Wi,n is set to the maximum value r.

Third Example

Set Weighting Factor in Accordance with Imaging Interval (Section)

Normally, in a case where imaging intervals are close to each other (imaging times are close to each other), it is considered that there is relatively little change between face images of a person captured at those imaging times, and hence there is practically no change between their feature vectors. On the other hand, in a case where imaging intervals are far apart from each other, changes may occur between face images of a person, and hence it is considered that there are changes between their feature vectors.

With this in mind, according to this third example, the weighting factor is set on the basis of the imaging interval. In a case where the imaging interval is short, the weighting factor is set to a small value to reduce the influence of one face image on face identification dictionary data, and in a case where the imaging interval is long, the weighting factor is set to a large value to increase the influence of one face image on face identification dictionary data.

There are various conceivable ways to determine whether an imaging interval is short or long. In the weighting factor computing method according to this third example, a period of time including the earliest and latest imaging times are divided into a plurality of sections, and the number of times face image data is captured (number of times imaging time is captured) in each divided section is computed. The imaging interval is determined to be long if the number of times of capture is small, and the imaging interval is determined to be short if the number of times of capture is large, and the weighting factors corresponding to the imaging times included in each divided section are set in accordance with the above determination result.

In the case where this third example is adopted as well, as for the weighting factor with respect to the feature data of personal dictionary data Di stored in association with person-specifying information specified on the basis of identification using a newly captured face image, not only the weighting factor Wi,New for the latest dictionary-data generating information DPIi,New (when N pieces of dictionary-data generating information are stored, DPIi,New=DPIi,N), but all the weighting factors Wi,n for previously captured and stored dictionary-data generating information DPIi,n (n=1, 2, . . . ) are re-calculated and updated.

Accordingly, in the case where this third computing method is adopted as well, the dictionary data update processing section 14 passes the imaging time information of all the pieces of updated dictionary-data generating information to the weighting-factor computing section 15. The weighting-factor computing section 15 uses those pieces of imaging time information to compute corresponding weighting factors.

Figure 13:
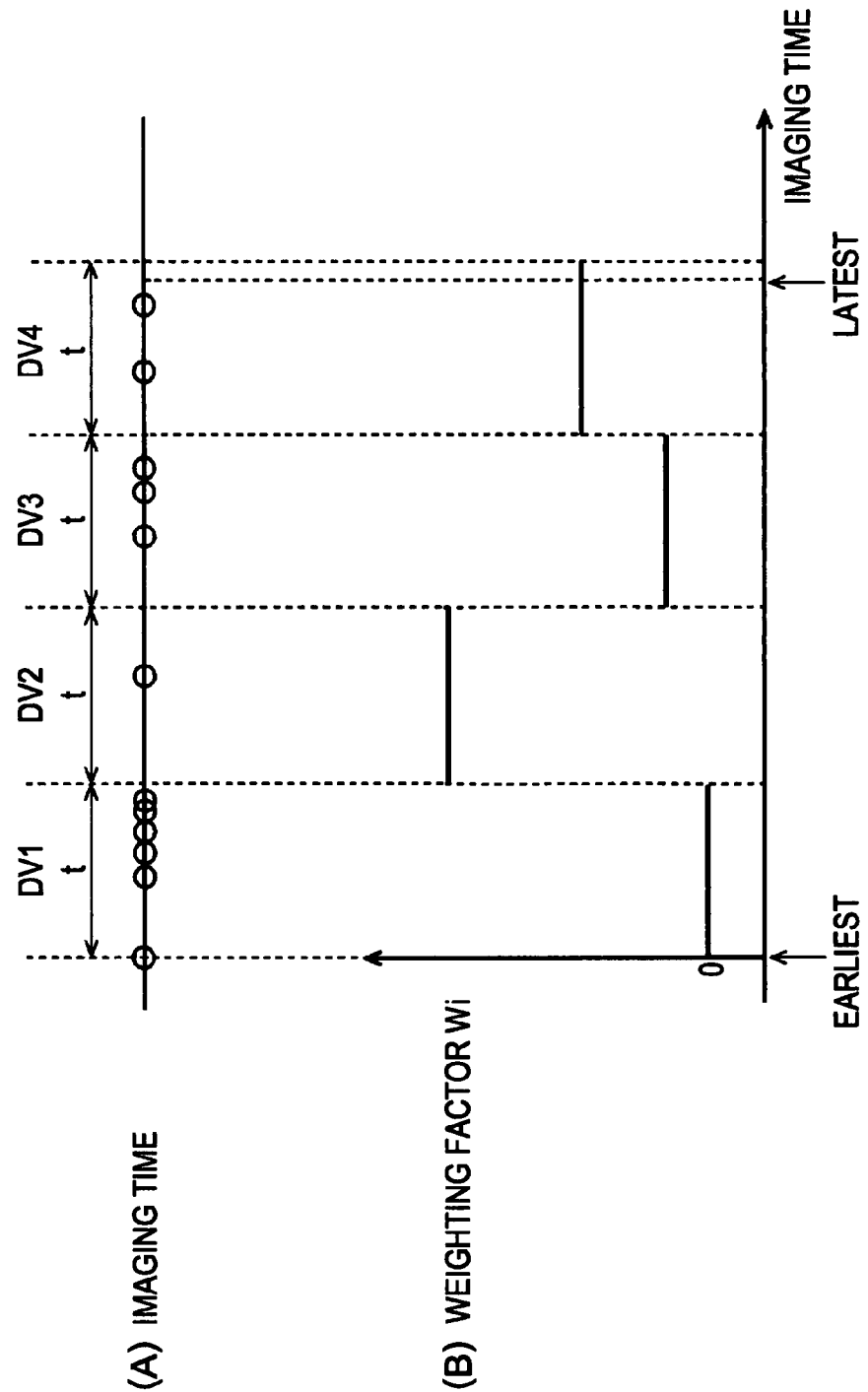
FIGS. 13A and 13B are diagrams illustrating a third example of weighting factor computing method in a personal identification device according to an embodiment of the present invention.

FIGS. 13A and 13B are diagrams illustrating the weighting factor computing method according to this third example. FIG. 13A is a diagram showing an imaging time distribution, with time taken along the horizontal direction. Each circular mark represents the imaging time. FIG. 13B shows an example of weighting factor for each divided section.

That is, in this third example, with the earliest imaging time Ti,1 of dictionary-data generating information after updating taken as a reference, a divided section is set for every predetermined length of time t set in advance. In the example shown in FIG. 13B, four divided sections DV1, DV2, DV3, DV4 are set.

Next, the number of imaging times included in each of the divided sections DV1, DV2, DV3, DV4 is counted. The weighting factor for each of the divided sections DV1, DV2, DV3, DV4 is determined such that the smaller the value of the count result, the larger the weighting factor.

In this case, in determining a weighting factor corresponding to the number of imaging times included in each of the divided sections DV1, DV2, DV3, DV4, there may be used various methods, including a method of assigning a weighting factor linearly with respect to the number of imaging times, and a method of assigning a weighting factor non-linearly with respect to the number of imaging times.

Then, it is determined in which divided section the imaging time Ti,n of each dictionary-data generating information DPIi,n is included, and the weighting factor set for the divided section thus determined is computed as the weighting factor Wi,n corresponding to that imaging time Ti,n.

While the predetermined length of time t set in advance may be set in a fixed manner, as in the adjustment and setting of the priority section PT described above, the predetermined length of time t may be adjusted and set by the user.

Instead of setting a divided section at every fixed section length with the earliest imaging time taken as a reference, each divided section may be set by dividing a time section from the earliest imaging time to the latest imaging time into a predetermined number of sections. When setting divided sections in this way, a section from a point in time earlier than the earliest imaging time by a margin time to a point in time later than the latest imaging time by a margin time may be divided into a predetermined number of sections.

Fourth Example

Set Weighting Factor in Accordance with Imaging Interval (Time Difference from Previous Image)

As in the third example described above, the weighting factor computing method according to this fourth example represents a method of computing a weighting factor in accordance with the imaging interval. As a way to determine whether an imaging interval is short or long, the method employs the time difference between the latest imaging time Ti,New and the immediately previous imaging time.

That is, in a case where the weighting factor computing method according to this fourth example is adopted, if the personal dictionary data Di stored in association with person-specifying information specified on the basis of identification using a newly captured face image is updated in the manner as described above, the dictionary data update processing section 14 passes the latest imaging time with respect to the newly captured face image and the immediately previous imaging time to the weighting factor computing section 15.

From the two pieces of imaging time information thus received, the weighting factor computing section 15 computes the time difference $\Delta T((\text{New}-1)\_\text{New})$ between the latest imaging time Ti,New and the immediately previous imaging time. Then, the weighting factor computing section 15 computes the weighting factor Wi,New corresponding to the computed time difference $\Delta T((\text{New}-1)\_\text{New})$.

In the case of the weighting factor computing method according to this fourth example, it is only necessary to compute the weighting factor Wi,New corresponding to the latest imaging time Ti,New. As for the weighting factors corresponding to other previous imaging times, the weighting factors stored as dictionary-data generating information may be used as they are, and there is no need to update those weighting factors.

In this fourth example, both a linear computation method and a non-linear computation method can be used as the method of computing the weighting factor Wi,New corresponding to the computed time difference $\Delta T((\text{New}-1)\_\text{New})$.

Figures 14, 15:
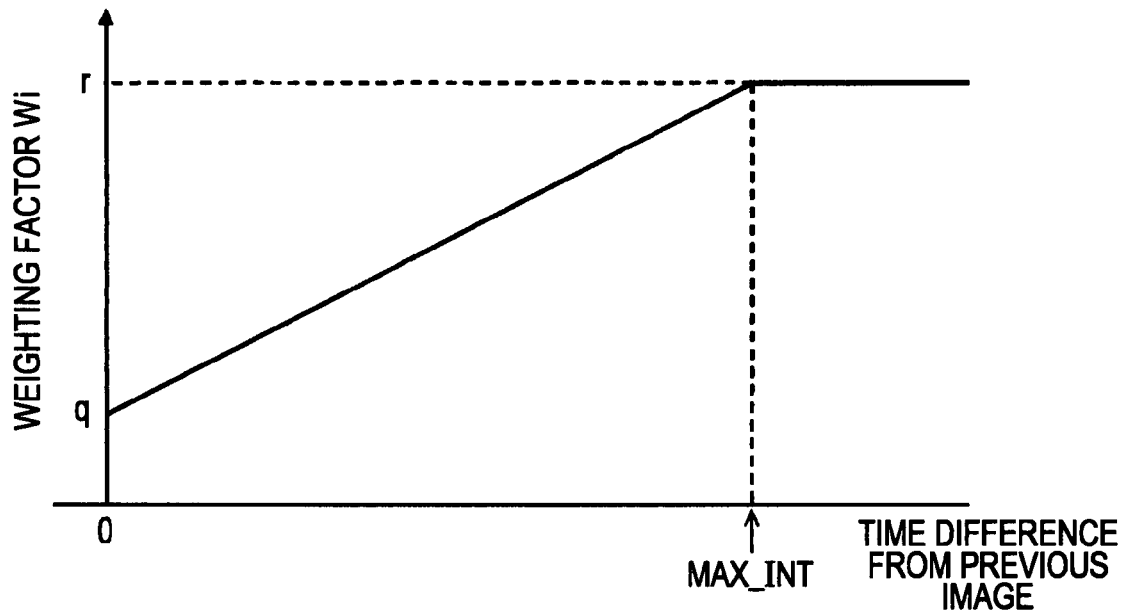
FIG. 14 is a diagram illustrating a fourth example of weighting factor computing method in a personal identification device according to an embodiment of the present invention.
FIG. 15 is a diagram illustrating an example of computing method for face identification dictionary data in a personal identification device according to an embodiment of the present invention.

FIG. 14 shows a case in which, in this fourth example, a linear computation method is adopted as the method of computing the weighting factor Wi,New corresponding to the computed time difference $\Delta T((\text{New}-1)\_\text{New})$.

That is, in the example shown in FIG. 14, the weighting factor computing section 15 computes the weighting factor Wi,New (when N or more pieces of dictionary-data generating information are stored as personal dictionary data Di, Wi,New=Wi,N) with respect to a newly captured face image by the following formula:

If the time difference $\Delta T((\text{New}-1)\_\text{New})<\text{MAX\_INT}$,
$Wi,n = p \times \Delta Ti(1\_n) + q$, and if the time difference $\Delta T((\text{New}-1)\_\text{New}) \geq$
$\text{MAX\_INT}, Wi,n = r$ (Formula 3)

Here, the threshold MAX_INT corresponds to a relatively long time interval during which a change is likely to occur between a previous captured face image and a newly captured face image. If the computed time difference $\Delta T((\text{New}-1)\_\text{New})$ is larger than this threshold MAX_INT, its weighting factor is set to the maximum so as to exert a large influence on face identification dictionary data. In this case, the threshold MAX_INT is, for example, 24 hours.

[Updating of Face Identification Dictionary Data FRDi]

When updating of the weighting factor $W_{i,n}$ with respect to the updated dictionary-data generating information $DPI_{i,n}$ is finished in the weighting-factor computing section 15 in this way, the dictionary data update processing section 14 stores the computed weighting factor $W_{i,n}$ as the updated weighting factor $W_{i,n}$ of each dictionary-data generating information $DPI_{i,n}$ of personal dictionary data Di corresponding to person-specifying information in the face identification dictionary database 10, and passes the updated weighting factor $W_{i,n}$ to the dictionary data generating/updating section 16, thus causing the dictionary data generating/updating section 16 to execute generation or updating of the face identification dictionary data FRDi.

The dictionary data generating/updating section 16 executes updating of the face identification dictionary data FRDi corresponding to specified person-specifying information by the computation formula (Formula 4) shown in FIG. 15. That is, the dictionary data generating/updating section 16 obtains updated face identification dictionary data FRDi by multiplying the feature vector $V_{i,n}$ included in each of a maximum of N pieces of dictionary-data generating information $DPI_{i,1}$ to $DPI_{i,N}$ by the corresponding weighting factor $W_{i,n}$, adding these multiplied values together, and dividing the total sum of the multiplied values by the total sum of N weighting factors $W_{i,n}$.

Since the value of this face identification dictionary data FRDi (corresponding to a feature vector) is obtained by using the weighting factors $W_{i,n}$ of N pieces of dictionary-data generating information $DPI_{i,1}$ to $DPI_{i,N}$, as compared with the related art in which the face identification dictionary data FRDi is determined as a simple average obtained by dividing the total sum of feature vectors included in N pieces of dictionary-data generating information $DPI_{i,1}$ to $DPI_{i,N}$ by the number N, an improvement is achieved in terms of the accuracy of the face identification dictionary data FRDi.

In this embodiment, as a finite number of N pieces of dictionary-data generating information $DPI_{i,1}$ to $DPI_{i,N}$, the latest data is retained in the face identification dictionary database 10 at all times, which means that face identification dictionary data FRDi is updated to a more accurate one.

It should be noted that when only N or less pieces of dictionary-data generating information $DPI_{i,n}$ exist in the face identification dictionary database 10 as personal dictionary data Di, the dictionary data updating processing section 14 adds and stores, as the latest dictionary-data generating information $DPI_{i,n}$, the feature vector, the acquisition time information, and the weighting factor Wnew with respect to a newly captured face image into the face identification dictionary database 10 to update the face identification dictionary database 10, thereby executing generation or updating of face identification dictionary data FRDi.

When generating face identification dictionary data FRDi in that case, the dictionary data generating/updating section 16 executes generation or updating of the face identification dictionary data FRDi by using the number of pieces of dictionary-data generating information $DPI_{i,n}$ stored as the personal dictionary data Di in the face identification dictionary database 10, instead of the number N in (Formula 4) mentioned above.

Once N pieces of dictionary-data generating information $DPI_{i,n}$ have been stored into the face identification dictionary database 10 as personal dictionary data Di, as described above, the dictionary data update processing section 14 discards the earliest dictionary-data generating information, and stores data including the feature data, imaging time information, and weighting factor of a newly captured face image as the latest dictionary-data generating information. In this way, the dictionary data update processing section 14 updates the dictionary-data generating information $DPI_{i,n}$ constituting the personal dictionary data Di, and performs updating of face identification dictionary data FRDi by using the weighting factor $W_{i,n}$ of each piece of the updated dictionary-data generating information $DPI_{i,n}$.

It should be noted that in the block configuration shown in FIG. 1 described above, each of the face identification image processing section 11, the face identification processing section 12, the display information generating section 13, and the dictionary data update processing section 14 including the weighting factor computing section 15 and the dictionary data generating/updating section 16 may be configured by hardware, or may be configured as a software function section so that the CPU 1 executes software processing on the basis of a software program stored in the ROM 3 and by using the RAM 4 as a work area.

In the above-described configuration, the dictionary-data generating information $DPI_{i,n}$ includes at least a feature vector, time information, a total score, and a weighting factor. However, the weighting factor may not be stored but computed when updating the face identification dictionary data FRDi from the latest imaging time captured and stored previous imaging times. It should be noted, however, that in the case where the weighting factor computing method according to the fourth example is adopted, since a previously computed weighting factor is not updated, it is preferable to store the weighting factor as well.

Further, it is also possible to store information of a captured face image instead of a feature vector, and extract a feature vector again from the stored face image information. In that case, at least face image information and imaging time information may be included in the dictionary-data generating information $DPI_{i,n}$.

[Processing Operation in Face Image Identification Device of FIG. 1]

[Face Identification Processing]

Next, description will be given of a face identification processing operation, a score computing operation with respect to the feature data of a captured face image, and a face identification dictionary data generation or update processing operation in the face image identification device configured as described above.

Figure 16:
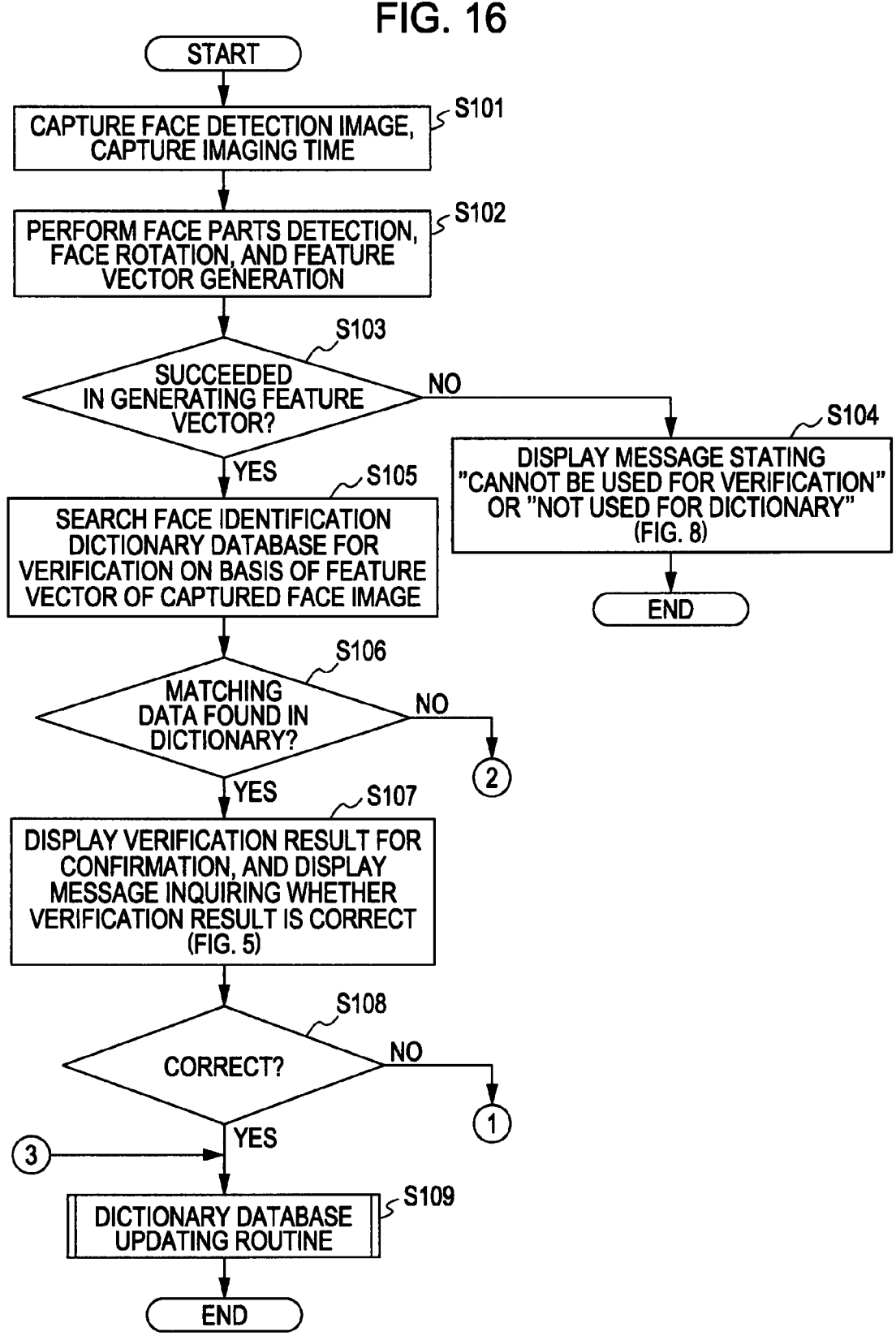
FIG. 16 is a diagram showing a part of a flow chart illustrating the flow of face identification processing in a personal identification device according to an embodiment of the present invention.
Figure 17:
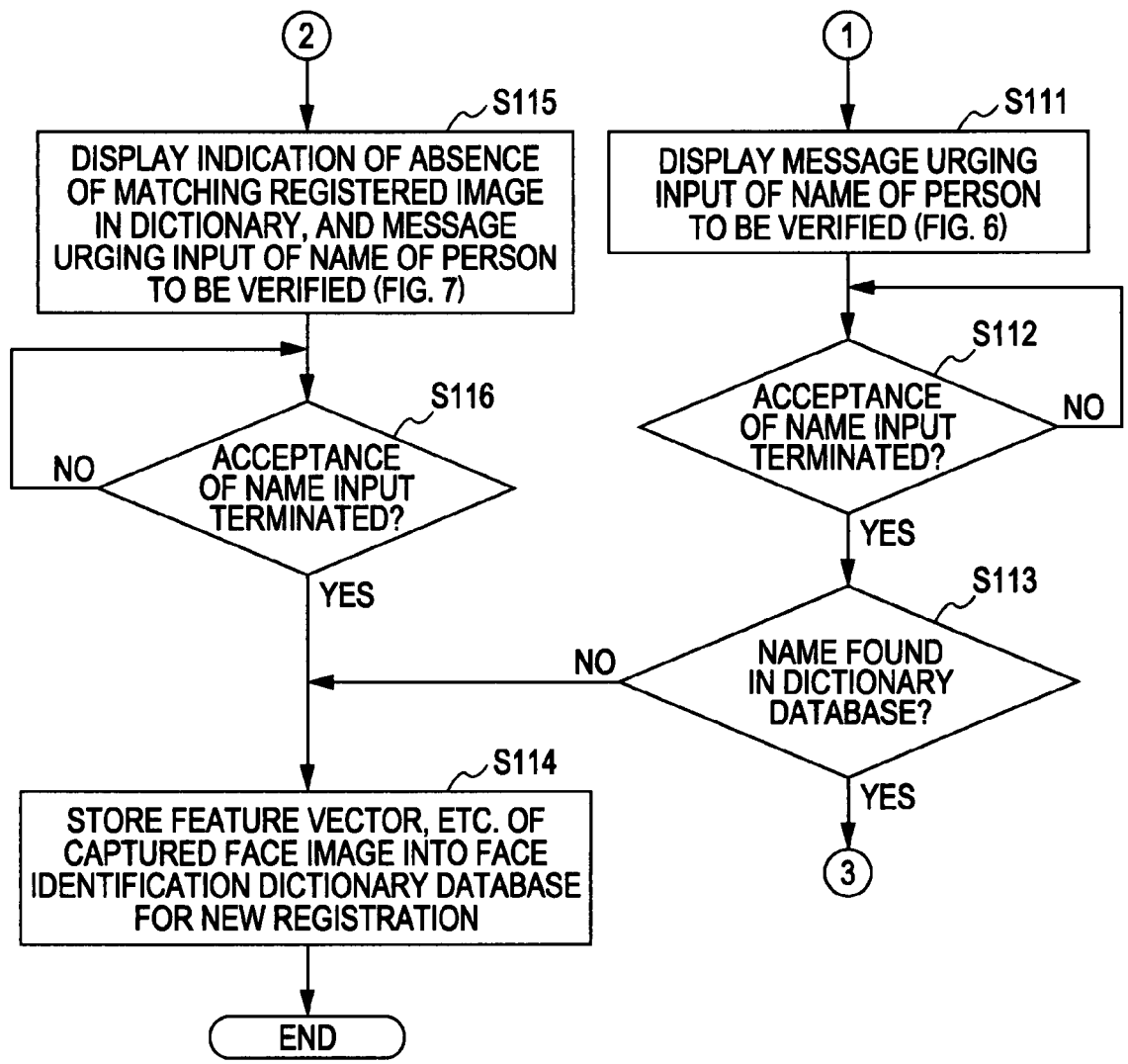
FIG. 17 is a diagram showing a part of a flow chart illustrating the flow of face identification processing in a personal identification device according to an embodiment of the present invention.

FIG. 16 and FIG. 17 continuing from FIG. 16 are flow charts illustrating an example of face identification processing operation. The processing operation described with reference to FIGS. 16 and 17 is executed by each of the image data inputting interface 7, the face identification image processing section 11, the face identification processing section 12, and the display information generating section 13 under the control of the CPU 1.

It should be noted that as previously described, the above-mentioned respective sections may be omitted by adopting a configuration in which the CPU 1 executes the processing of each of the above-mentioned sections as software processing on the basis of a software program stored in the ROM 3 and by using the RAM 4 as a work area.

First, the CPU 1 captures image data including a face image and accompanying information including Exif information via the image data inputting interface 7, and transfers them to the face identification image processing section 11 (step S101).

On the basis of a control start command from the CPU 1, the face identification image processing section 11 performs face image and eye detection, and face rotation processing based on the detected eye position from the received image data as described above, and generates a feature vector from data obtained by plotting feature points (step S102). At this time, imaging time information is extracted from the Exif information accompanying the image data and retained.

Then, if generation of a feature vector succeeded, the face identification image processing section 11 outputs information to that effect and the generated feature vector, and if generation of a feature vector failed due to such reasons that the image data size of a face image is too small, the face identification image processing section 11 outputs information indicating the failure in generating a feature vector.

The CPU 1 determines whether or not generation of a feature vector of a face image has succeeded, on the basis of information from the face identification image processing section 11 (step S103). Then, if information indicating failure in generating a feature vector of a face image has been outputted from the face identification image processing section 11, and thus it is determined that generation of a feature vector has failed, the CPU 1 transfers the information to that effect to the display information generating section 13.

Upon receiving this information indicating failure in generating a feature vector of a face image, the display information generating section 13 generates and outputs the display information of the verification error notification screen shown in FIG. 8. The CPU 1 sends the display information of this verification error notification screen to the display 9 via the display interface 6 and, as shown in FIG. 8, displays the message 29 indicating that verification cannot be performed by using the captured face image, and that the captured face image is not to be used for dictionary (step S104).

Further, if it is determined in step S103 that information indicating success in generating a feature vector of a face image and the generated feature vector have been outputted from the face identification image processing section 11, the CPU 1 transfers information indicating the success and the generated feature vector to the face identification processing section 12.

On the basis of the feature vector of a face image thus received, the face identification processing section 12 searches face identification dictionary data FRDi in the face identification dictionary database 10 to look for face identification dictionary data FRDi that can be judged as a match. Upon detecting face identification dictionary data FRDi that can be judged as a match, the face identification processing section 12 outputs information to that effect, and person-specifying information corresponding to that face identification dictionary data FRDi judged as matching, which in this example is first and last name information of a person. If no face identification dictionary data FRDi that can be judged as a match could be detected, the face identification processing section 12 outputs information to that effect (step S105).

In response to the output from the face identification processing section 12, the CPU 1 determines whether or not face identification dictionary data FRDi that can be judged as a match (step S106) has been detected, and upon determining that face identification dictionary data FRDi that can be judged as a match has been detected, the CPU 1 transfers to the display information generating section 13 the first and last name information of a person received from the face identification processing section 12 and serving as person-specifying information corresponding to the face identification dictionary data FRDi that has been judged as matching, together with information indicating the success of face identification.

Upon receiving the information indicating the success of face identification and the first and last name information of a person, the display information generating section 13 generates and outputs the display information of the face identification result confirmation screen as shown in FIG. 5 urging the user to confirm the face identification result. The CPU 1 sends the display information of this face identification result confirmation screen to the display 9 via the display interface 6, and displays the message 22 as shown in FIG. 5 inquiring the user whether or not the face identification result is correct (step S107).

Then, the CPU 1 waits for a user's confirmation operation input on the screen shown in FIG. 5, and determines whether or not this confirmation operation input indicates that the verification result of face identification is correct (step S108). If it is determined that the user's confirmation operation input indicates that the verification result is "correct", the CPU 1 executes an update routine for the face identification dictionary database 10 (step S109). The details of this update routine for the face identification dictionary database 10 will be described later.

If it is determined in step S108 that the user's confirmation operation input indicates that the verification result is "incorrect", the CPU 1 sends information to that effect to the display information generating section 13. Then, the display information generating section 13 generates and outputs the display information of the face identification result incorrect screen as shown in FIG. 6, so the CPU 1 sends that display information to the display 9 via the display interface 6, and displays the message 25 shown in FIG. 6 urging the user to input a first and last name to specify whose face image a captured face image is (step S111 in FIG. 17).

Then, the CPU 1 waits for a user's input of first and last name into the first and last name input field 26 (step S112). Upon determining that an input of first and last name has been accepted, the CPU 1 determines whether or not there is personal dictionary data Di for the inputted first and last name (step S113). Then, if it is determined that there is personal dictionary data Di for the inputted first and last name, the process transfers to step S109 to execute the update routine for the face identification dictionary database 10.

If it is determined in step S113 that personal dictionary data Di for the inputted first and last name does not exist in the face identification dictionary database 10, with the inputted first and last name as person-specifying information, the CPU 1 stores and newly registers personal dictionary data Di associated with this person-specifying information into the face identification dictionary database 10 (step S114). In this case, as shown in FIG. 2, the personal dictionary data Di to be newly registered includes information such as the feature vector, imaging time, and weighting factor of a captured face image. Since there is only one feature vector for a face image captured for the first time, it is also registered as face identification dictionary data as it is.

It should be noted that the above-mentioned new registration of personal dictionary data Di into the face identification dictionary database 10 can be also executed as a part of update processing of the face identification dictionary database 10 described later.

Next, if it is determined in step S106 that face identification dictionary data FRDi that can be judged as matching the feature vector of a captured face image has not been detected, the CPU 1 sends information to the effect to the display information generating section 13. Upon receiving the information indicating that face identification dictionary data FRDi that can be judged as a match has not been detected, the display information generating section 13 generates and outputs the display information of the face identification result no match screen as shown in FIG. 7 for informing the user of "no match" as the face identification result. The CPU 1 sends that display information to the display 9 via the display interface 6, and displays the message 28 shown in FIG. 7 urging the user to input a first and last name to specify whose face image a captured face image is (step S115 in FIG. 17).

Then, the CPU 1 waits for a user's input of first and last name into the first and last name input field 28 (step S116). Upon determining that an input of first and last name has been accepted, with the inputted first and last name as person-specifying information, the CPU 1 stores and newly registers personal dictionary data Di associated with this person-specifying information into the face identification dictionary database 10 (step S114).

[Update Processing of Face Identification Dictionary Database]

Figure 18:
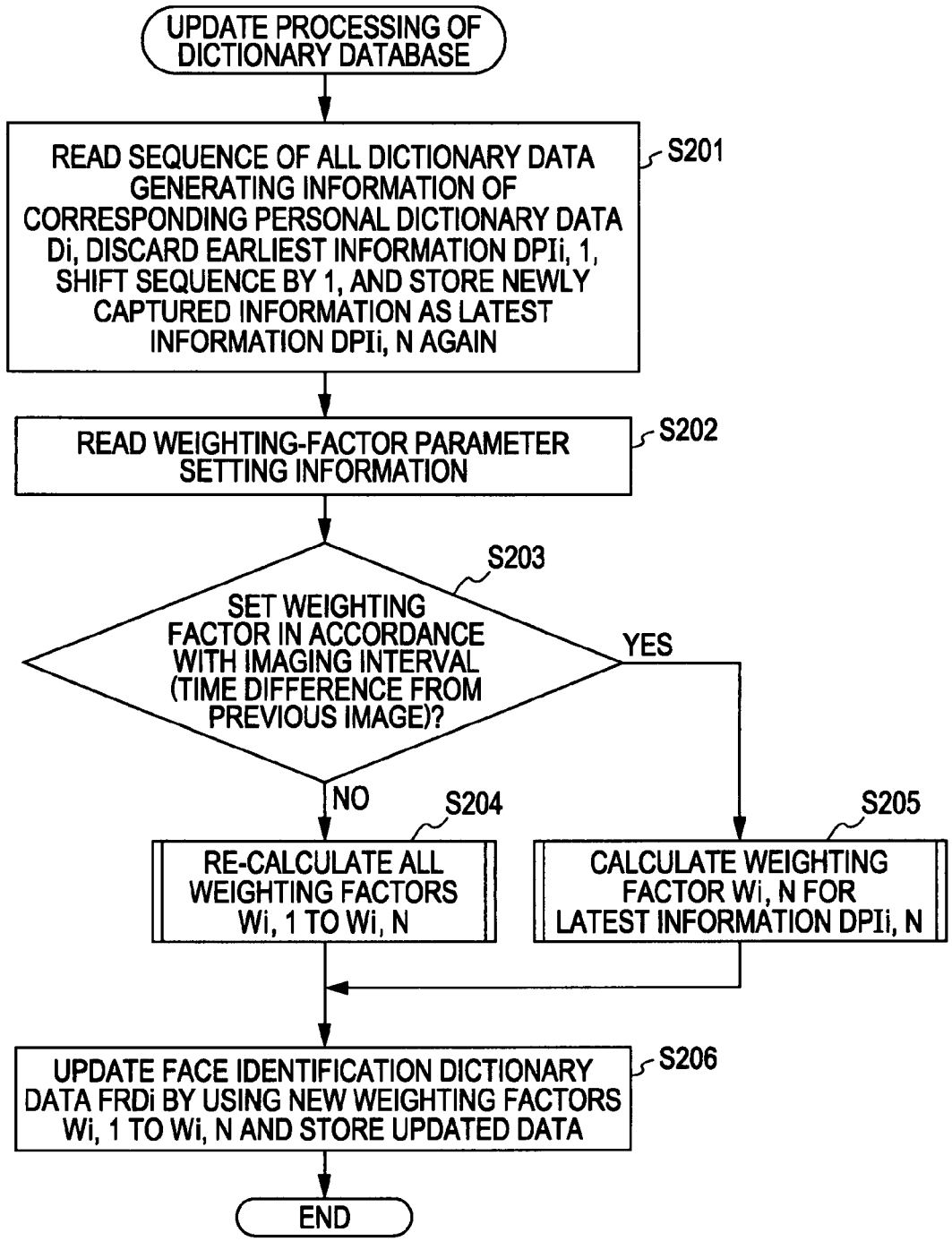
FIG. 18 is a diagram showing a part of a flow chart illustrating the flow of update processing of face identification dictionary data in a personal identification device according to an embodiment of the present invention.

Next, description will be given of update processing of the face identification dictionary database in step S109 of FIG. 16. FIG. 18 is a flow chart showing an example of update processing of the face identification dictionary database. In this embodiment, each of the processing steps shown in FIG. 18 is executed by the dictionary data update processing section 14 including the weighting-factor computing section 15 and the dictionary data generating/updating section 16 under the control of the CPU 1. It should be noted that as previously described, the above-mentioned respective sections may be omitted by adopting a configuration in which the CPU 1 executes the processing of each of the above-mentioned sections as software processing on the basis of a software program stored in the ROM 3 and by using the RAM 4 as a work area.

It should be noted that for the sake of simplicity, the following description is directed to the case of processing after N pieces of dictionary-data generating information DPIi,n of person-specifying information Di have been stored.

First, the dictionary data update processing section 14 reads all the pieces of dictionary-data generating information DPIi,n of personal dictionary data Di corresponding to person-specifying information that has been specified, discards information DPIi,1 with the earliest imaging time, and sequentially shifts the sequence of the dictionary-data generating information DPIi,n toward earlier imaging time. Then, the newly captured feature vector and imaging time information are stored into the face identification dictionary database 10 again as the latest information DPIi,N (step S201).

Next, the dictionary data update processing section 14 reads the weighting-factor parameter setting information ST from the face identification dictionary database 10 and passes the weighting-factor parameter setting information ST to the weighting-factor computing section 15, thereby informing the weighting-factor computing section 15 of which weighting factor computing method is adopted (step S202).

Upon receiving this weighting-factor parameter setting information ST, the weighting-factor computing section 15 first determines whether or not the weighting factor computing method being selected by the user is the method according to the fourth example "Set a weighting factor in accordance with the imaging interval (time difference from the previous image" described above (step S203).

If it is determined in step S203 that the weighting factor computing method being selected by the user is not the above-described method of the fourth example, the weighting-factor computing section 15 acquires the imaging time information Ti,n (n=1 to N) of all the pieces of dictionary-data generating information DPIi,n of the updated personal dictionary data Di, and re-calculates and updates all the weighting factors Wi,n (n=1 to N) (step S204).

Then, subsequent to step S204 mentioned above, the dictionary data generating/updating section 16 acquires the weighting factors Wi,n (n=1 to N) generated in step S204, and assigns the thus acquired weighting factors Wi,n (n=1 to N) to the corresponding feature vectors Vi,n. Then, the dictionary data generating/updating section 16 generates or updates face identification dictionary data FRDi by using (Formula 4) shown in FIG. 15 described above, and writes the generated or updated face identification dictionary data FRDi back into the face identification dictionary database 10 as face identification dictionary data FRDi corresponding to the above-mentioned person-specifying information (step S206).

If it is determined in step S203 that the weighting factor computing method being selected by the user is the above-described method of the fourth example, the weighting-factor computing section 15 acquires, from among the dictionary-data generating information DPIi,n of the updated personal dictionary data Di, the latest imaging time information Ti,N and its immediately previous imaging time information Ti, (N−1), and computes the weighting factor Wi,N with respect to the latest feature vector Vi,N (step S205).

Then, subsequent to step S205 mentioned above, the dictionary data generating/updating section 16 acquires the weighting factor Wi,N generated in step S204, acquires weighting factors Wi,n (n=1 to (N−1)) for all the pieces of previous dictionary-data generating information, and assigns the thus acquired weighting factors to the corresponding feature vectors Vi,n. Then, the dictionary data generating/updating section 16 generates or updates face identification dictionary data FRDi by using (Formula 4) shown in FIG. 15 described above, and writes the generated or updated face identification dictionary data FRDi back into the face identification dictionary database 10 as face identification dictionary data FRDi corresponding to the above-mentioned person-specifying information (step S206).

[Re-Calculation of Weighting Factors]

Next, the weighting-factor computation processing shown in steps S204 and S205 of FIG. 18 will be described with reference to FIG. 19 and FIG. 20 continuing from FIG. 19. It should be noted that while the processing procedure of FIG. 18 is described from the viewpoint of whether to re-calculate weighting factors with respect to all the feature vectors or to compute a weighting factor only with respect to a feature vector captured at new imaging time, FIGS. 19 and 20 illustrate a case where processing is executed by sequentially determining what the weighting-factor parameter setting information ST is.

Figure 19:
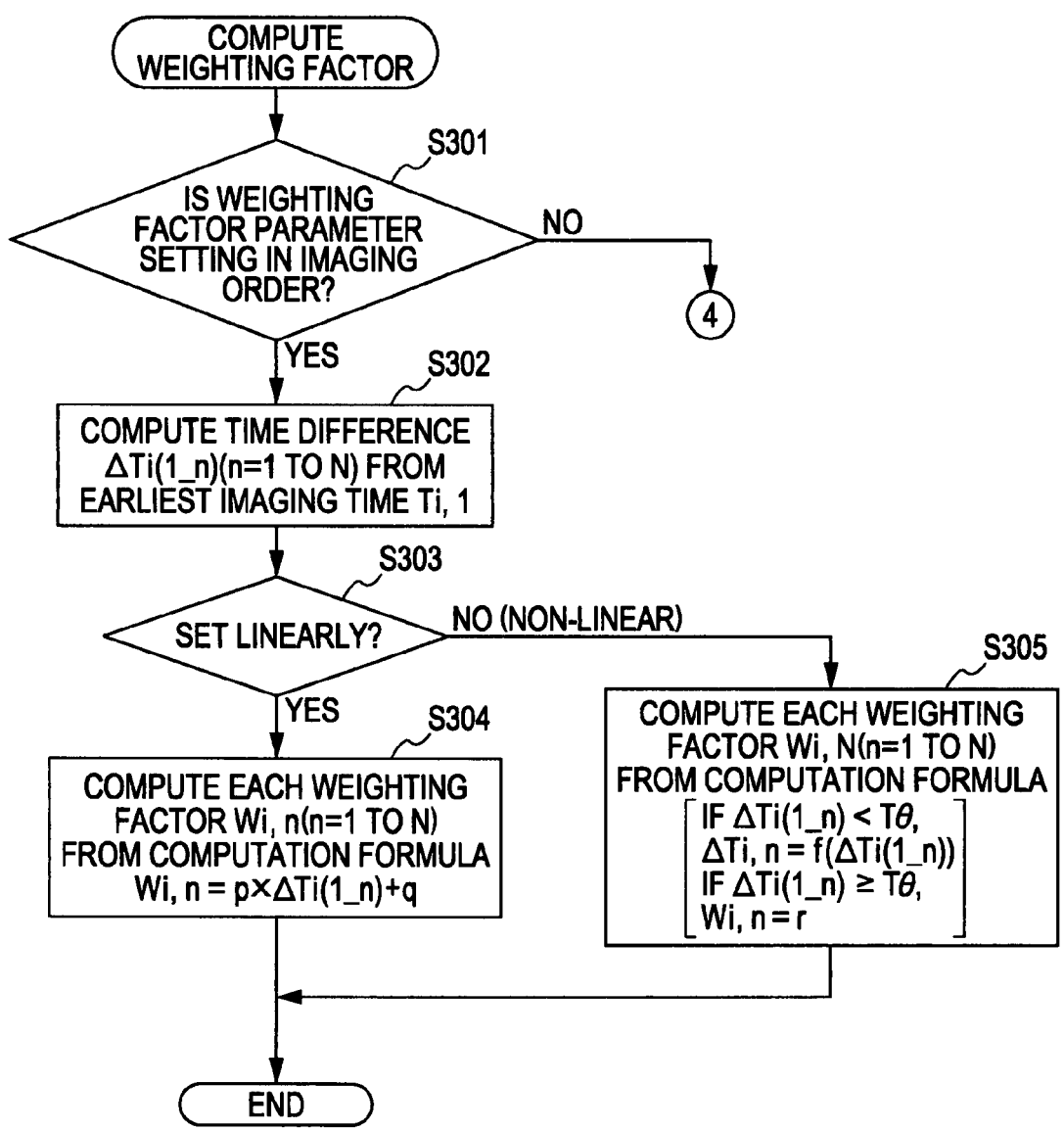
FIG. 19 is a diagram showing a part of a flow chart illustrating the flow of weighting-factor computation processing in a personal identification device according to an embodiment of the present invention.
Figure 20:
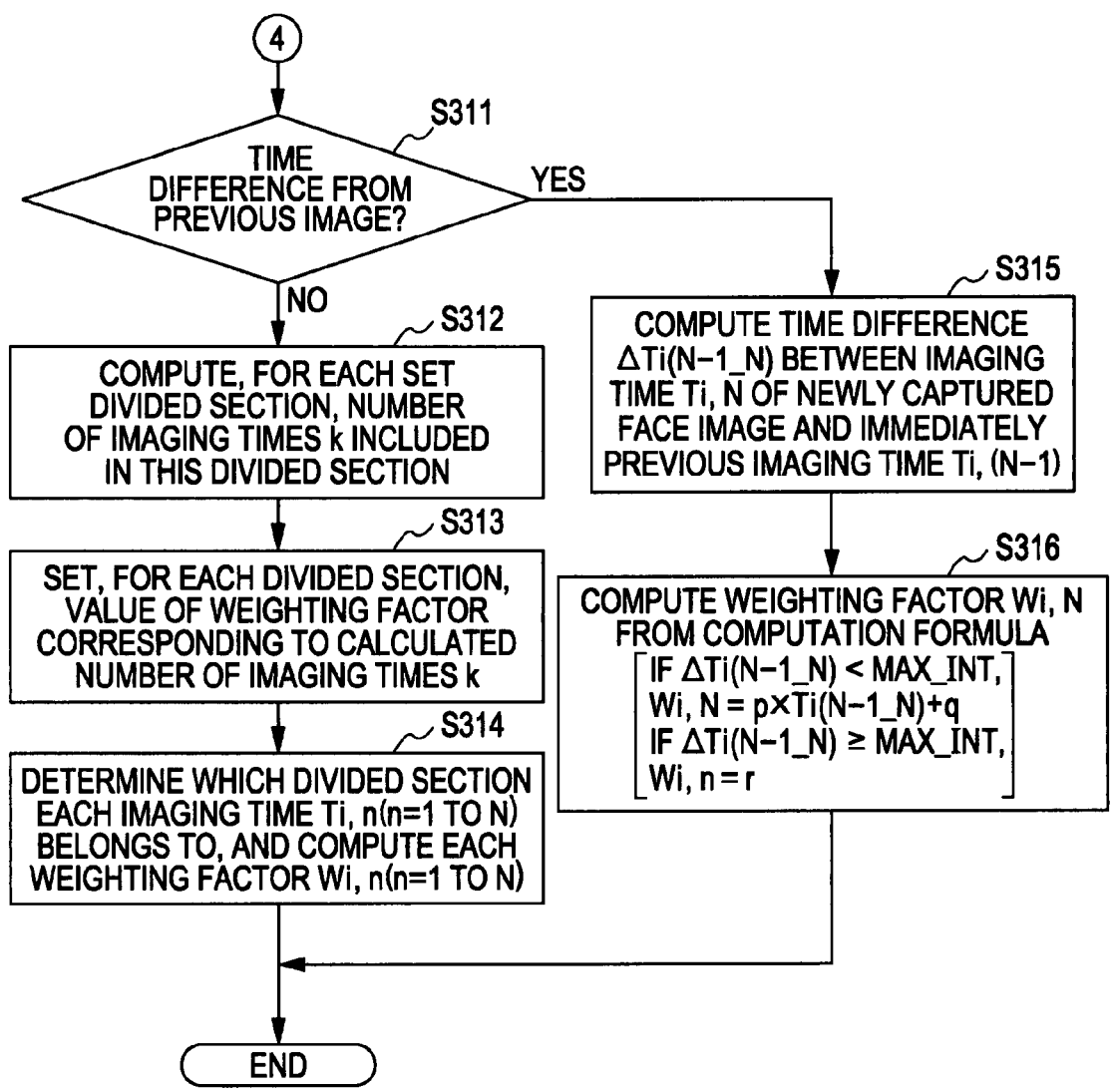
FIG. 20 is a diagram showing a part of a flow chart illustrating the flow of weighting-factor computation processing in a personal identification device according to an embodiment of the present invention.

That is, as shown in FIG. 19, the weighting factor computing section 15 first determines whether or not the weighting factor computing method being selected by the user is the method of computing a weighting factor in the imaging order (step S301).

If it is determined in step S301 that the selected method is the method of computing a weighting factor in accordance with the imaging order, the weighting factor computing section 15 acquires the imaging time information Ti,n (n=1 to N) of all the pieces of dictionary-data generating information DPIi,n of the updated personal dictionary data Di, and computes the time difference ΔTi(1_n) (n=1 to N) between the earliest imaging time Ti,1 and each imaging time Ti,n (n=1 to N) (step S302).

Then, the weighting factor computing section 15 determines whether or not the weighting-factor setting method based on the imaging order is the method of setting a weighting factor linearly (step S303). If it is determined that the setting method is the method of setting a weighting factor linearly, as described above with reference to the linear computation method, the weighting factor computing section 15 computes the weighting factor Wi,n with respect to each feature vector Vi,n by (Formula 1) mentioned above, and passes the computed weighting factor Wi,n to the dictionary data generating/updating section 16 (step S304). Then, this processing routine is ended.

If it is determined in step S303 that the weighting-factor setting method based on the order of imaging is the method of setting a weighting factor non-linearly, as described above with reference to the non-linear computation method, the weighting factor computing section 15 computes the weighting factor Wi,n with respect to each feature vector Vi,n by (Formula 2) mentioned above, and passes the computed weighting factor Wi,n to the dictionary data generating/updating section 16 (step S305). Then, this processing routine is ended.

If it is determined in step S301 that the weighting factor computing method being selected by the user is not the method of computing a weighting factor in accordance with the imaging order, the weighting factor computing section 15 determines whether or not the weighting factor computing method being selected by the user is the setting method based on the imaging interval (difference from the previous image) according to the fourth example described above (step S311 in FIG. 20).

If it is determined in step S311 that the weighting factor computing method being selected by the user is not the setting method based on the imaging interval (difference from the previous image) according to the above-described fourth example but is the setting method based on the imaging interval (section) according to the above-described third example, as described above with reference to FIGS. 13A and 13B, the weighting factor computing section 15 sets a plurality of divided sections, and calculates, for each of the divided sections thus set, the number of imaging times k included in that divided section (step S312).

Next, the weighting factor computing section 15 sets a weighting factor for each divided section in accordance with the computed number of imaging times (step S313). Then, the weighting factor computing section 15 determines to which divided section each imaging time Ti,n belongs to, and on the basis of this determination result, computes the weighting factor Wi,n corresponding to each imaging time Ti,n (step S314). Then, this processing routine is ended.

Each weighting factor Wi,n thus computed is passed to the dictionary data generating/updating section 16, and stored as each dictionary-data generating information DPIi,n.

If it is determined in step S311 that the weighting factor computing method being selected by the user is the setting method based on the imaging interval (difference from the previous image) according to the above-described fourth example, the weighting factor computing section 15 computes the time difference ΔTi(N_N−1) between the imaging time Ti,N of a newly captured face image and the immediately previous imaging time Ti, (N−1) (step S315).

Then, the weighting factor computing section 15 computes the weighting factor Wi,N for the feature vector of a face image captured at new imaging time Ti,N in accordance with the computation formula (Formula 3) described above (step S316). Then, this processing routine is ended.

The computed weighting factor Wi,N is passed to the dictionary data generating/updating section 16, and stored as dictionary-data generating information DPIi,N.

It should be noted that the foregoing description is directed to a case in which after personal identification is performed, subsequent to this personal identification, updating of face identification dictionary data using a newly captured face image is performed. However, it is also possible to temporarily store the data or feature vector, time information, and weighting factor of a newly captured face image, and perform updating of face identification dictionary data at a suitable point in time after the personal identification.

Effect of Embodiment

As described in the foregoing, according to the above-mentioned embodiment, at the time of updating computation of face identification dictionary data FRDi, instead of taking a simple average of the individual feature vectors of N pieces of dictionary-data generating information DPIi,n, each feature vector is multiplied by a weighting factor, which is computed on the basis of imaging time and becomes greater as the imaging time becomes later, and the total sum of these multiplied values is divided by the total sum of the weighting factors. Therefore, each feature vector contributes to the generation of face identification dictionary data FRDi in accordance with its imaging time, thereby making it possible to obtain more accurate dictionary data.

OTHER EMBODIMENTS

While the foregoing description is directed to a case in which the present invention is applied to a face identification processing device, it is needless to mention that the range of applications of the present invention is not limited to such a personal identification device using face images.

For example, the present invention is also applicable to a case in which, in personal identification processing, personal identification is performed on the basis of identification elements that change over time, such as the human voice, and in which weighting factors are computed on the basis of the capture time at which each of those identification elements are captured to thereby update the dictionary data used for personal identification.

It should be understood by those skilled in the art that various modifications, combinations, sub-combinations and alterations may occur depending on design requirements and other factors insofar as they are within the scope of the appended claims or the equivalents thereof.

What is claimed is:

1. A personal identification device comprising:
a dictionary data storing section that stores identification dictionary data for a person to be identified, which is generated from feature data extracted from an identification element for identifying the person, in association with person-specifying information for specifying the person;
identification means for comparing feature data extracted from an identification element extracted from the person, against the identification dictionary data in the dictionary data storing section to identify a person who has the captured identification element;

time acquiring means for acquiring information on capture time of an identification element captured from the person;

person-specifying means for obtaining the person-specifying information that specifies a person who has the captured identification element, on the basis of a result of identification of the person by the identification means;

dictionary-data generating information storing means for adding and storing data of the captured identification element or feature data extracted from the identification element, and time information acquired by the time acquiring means into the dictionary-data generating information storing section, in association with the person-specifying information acquired by the person-specifying means; and dictionary data update processing means for generating or updating the identification dictionary data corresponding to the person-specifying information acquired by the person-specifying means, by using information on capture time newly acquired by the time acquiring means, information on capture time of the identification element acquired previously and stored in the dictionary-data generating information storing section in association with the person-specifying information acquired by the person-specifying means, and feature data captured at each capture time, the dictionary data update processing means being configured to update the identification dictionary data by weighting each piece of the feature data by a weighting factor according to its capture time.

2. The personal identification device according to claim 1, wherein the dictionary data update processing means includes:

weighting factor computing means for computing a weighting factor for feature data with respect to the newly captured identification element, and a weighting factor for feature data with respect to the identification element captured previously, by using time information newly acquired by the time acquiring means and information on capture time of the identification element acquired previously and stored in the dictionary-data generating information storing section in association with the person-specifying information acquired by the person-specifying means; and dictionary data generating or updating means for assigning each of the weighting factors computed by the weighting factor computing means to feature data of the identification element captured previously and stored in the dictionary-data generating information storing section in association with the person-specifying information acquired by the person-specifying means, and to feature data of the newly acquired identification element, and for generating or updating the identification dictionary data stored in association with the person-specifying information acquired by the person-specifying means, by using the plurality of pieces of weighted feature data.

3. The personal identification device according to claim 1, wherein the dictionary data update processing means includes:

weighting factor computing means for computing a weighting factor for feature data with respect to the newly captured identification element of a person, by using time information newly acquired by the time acquiring means and information on capture time of the identification element acquired previously and stored in the dictionary-data generating information storing section in association with the person-specifying information acquired by the person-specifying means, and for adding and storing the computed weighting factor into the dictionary-data generating information storing section; and dictionary data generating or updating means for assigning a corresponding weighting factor stored in the dictionary-data generating information storing section to feature data of the identification element acquired previously and stored in the dictionary-data generating information storing section in association with the person-specifying information acquired by the person-specifying means, assigning a weighting factor computed by the weighting factor computing means to feature data of the newly acquired identification element, and generating or updating the identification dictionary data stored in association with the person-specifying information acquired by the person-specifying means, by using the plurality of pieces of weighted feature data.

4. The personal identification device according to claim 1, wherein:

the dictionary-data generating information storing section can store a finite number of pieces of data of an identification element of the person which can be stored in association with the person-specifying information or a finite number of pieces of feature data extracted from the identification element, and a finite number of pieces of time information acquired by the time acquiring means; and after storing the finite number of pieces of data or feature data of the identification element which can be stored in the dictionary-date generating information storing section in association with the person-specifying information, and the acquired time information, when an identification element of the person is newly captured, data with the earliest capture time is discarded, and data or feature data of the newly captured identification element and the acquired time information are stored into the dictionary-data generating information storing section.

5. The personal identification device according to claim 1, wherein:

the weighting factor computing means computes the weighting factor with respect to each piece of the feature data on the basis of capture time of the identification element such that the weighting factor increases linearly toward the latest point in a time series.

6. The personal identification device according to claim 1, wherein:

the weighting factor computing means computes the weighting factor with respect to each piece of the feature data on the basis of capture time of the identification element such that the weighting factor increases non-linearly toward the latest time point in a time series.

7. The personal identification device according to claim 1, wherein:

the weighting factor computing means computes the weighting factor with respect to each piece of the feature data on the basis of a time difference between each capture time of the identification element and the earliest capture time of the identification element.

8. The personal identification device according to claim 1, wherein:

the weighting factor computing means divides a period of time including the earliest and latest capture times of the identification element into a plurality of predetermined time length sections, counts the number of capture times of the identification element included in each of the predetermined time length sections, and computes the weighting factor with respect to each piece of the feature data for each of the predetermined time length sections such that the weighting factor increases as the count value becomes larger.

9. The personal identification device according to claim 1, wherein:
when the identification element is newly captured, the weighting factor computing means computes a weighting factor with respect to feature data of the newly captured identification element on the basis of a time difference between capture time of the newly captured identification element, and capture time of the identification element captured immediately previous to the newly captured identification element.

10. The personal identification device according to claim 1, wherein:
the personal identification device includes a plurality of weighting factor computing methods for use by the weighting factor computing means; and
the personal identification device further comprises means for inquiring a user which of the plurality of weighting factor computing methods is to be used, and accepting a user's selection and setting with respect to the inquiry, wherein the weighting factor computing means computes the weighting factor by using the weighting factor computing method selected and set by the user.

11. A personal identification method comprising:
an identification step of comparing feature data extracted from an identification element extracted from a person, against identification dictionary data of the person to be identified which is generated from the feature data to identify a person who has the captured identification element, the identification dictionary data being stored in a dictionary data storing section in association with person-specifying information for specifying the person;
a time acquiring step of acquiring information on capture time of an identification element captured from the person;
a person-specifying step of obtaining the person-specifying information that specifies a person who has the captured identification element, on the basis of a result of identification of the person in the identification step;
a dictionary-data generating information storing step of adding and storing data of the captured identification element or feature data extracted from the identification element, and time information acquired in the time acquiring step into the dictionary-data generating information storing section, in association with the person-specifying information acquired in the person-specifying step; and
a dictionary data update processing step of generating or updating the identification dictionary data corresponding to the person-specifying information acquired in the person-specifying means, by using information on capture time newly acquired in the time acquiring step, information on capture time of the identification element acquired previously and stored in the dictionary-data generating information storing section in association with the person-specifying information acquired in the person-specifying step, and feature data captured at each capture time, the dictionary data update processing step being configured to update the identification dictionary data by weighting each piece of the feature data by a weighting factor according to its capture time.

12. The personal identification method according to claim 11, wherein the dictionary data update processing step includes:
a weighting factor computing step of computing a weighting factor for feature data with respect to the newly captured identification element, and a weighting factor for feature data with respect to the identification element captured previously, by using time information newly acquired in the time acquiring step and information on capture time of the identification element acquired previously and stored in the dictionary-data generating information storing section in association with the person-specifying information acquired in the person-specifying step; and
a dictionary data generating or updating step of assigning each of the weighting factors computed in the weighting factor computing step to feature data of the identification element captured previously and stored in the dictionary-data generating information storing section in association with the person-specifying information acquired in the person-specifying step, and to feature data of the newly acquired identification element, and generating or updating the identification dictionary data stored in association with the person-specifying information acquired in the person-specifying step, by using the plurality of pieces of weighted feature data.

13. The personal identification method according to claim 11, wherein the dictionary data update processing step includes:
a weighting factor computing step of computing a weighting factor for feature data with respect to the newly captured identification element of a person, by using time information newly acquired in the time acquiring step and information on capture time of the identification element acquired previously and stored in the dictionary-data generating information storing section in association with the person-specifying information acquired in the person-specifying step, and for adding and storing the computed weighting factor into the dictionary-data generating information storing section; and
a dictionary data generating or updating step of assigning a corresponding weighting factor stored in the dictionary-data generating information storing section to feature data of the identification element acquired previously and stored in the dictionary-data generating information storing section in association with the person-specifying information acquired in the person-specifying step, assigning a weighting factor computed by the weighting factor computing step to feature data of the newly acquired identification element, and generating or updating the identification dictionary data stored in association with the person-specifying information acquired in the person-specifying step, by using the plurality of pieces of weighted feature data.

14. An updating method for identification dictionary data in a personal identification device that compares identification dictionary data of a person to be identified, which is generated from feature data extracted from an identification element for identifying the person and stored in association with person-specifying information for specifying the person, against feature data extracted from an identification element captured from a person to identify a person who has the captured identification element, comprising:
a time acquiring step of acquiring information on capture time of an identification element captured from the person;

a person-specifying step of obtaining the person-specifying information that specifies a person who has the captured identification element, on the basis of a result of identification of a person who has the captured identification element;

a dictionary-data generating information storing step of adding and storing data of the captured identification element of a person or feature data extracted from the identification element, and time information acquired in the time acquiring step into the dictionary-data generating information storing section, in association with the person-specifying information acquired in the person-specifying step; and a dictionary data update processing step of generating or updating the identification dictionary data corresponding to the person-specifying information acquired in the person-specifying means, by using information on capture time newly acquired in the time acquiring step, information on capture time of the identification element acquired previously and stored in the dictionary-data generating information storing section in association with the person-specifying information acquired in the person-specifying step, and feature data captured at each capture time, the dictionary data update processing step being configured to update the identification dictionary data by weighting each piece of the feature data by a weighting factor according to its capture time.

15. The updating method for identification dictionary data according to claim 14, wherein the dictionary data update processing step includes:

a weighting factor computing step of computing a weighting factor for feature data with respect to the newly captured identification element, and a weighting factor for feature data with respect to the identification element captured previously, by using time information newly acquired in the time acquiring step and information on capture time of the identification element acquired previously and stored in the dictionary-data generating information storing section in association with the person-specifying information acquired in the person-specifying step; and a dictionary data generating or updating step of assigning each of the weighting factors computed in the weighting factor computing step to feature data of the identification element captured previously and stored in the dictionary-data generating information storing section in association with the person-specifying information acquired in the person-specifying step, and to feature data of the newly acquired identification element, and generating or updating the identification dictionary data stored in association with the person-specifying information acquired in the person-specifying step, by using the plurality of pieces of weighted feature data.

16. The updating method for identification dictionary data according to claim 14, wherein the dictionary data update processing step includes:

a weighting factor computing step of computing a weighting factor for feature data with respect to the newly captured identification element of a person, by using time information newly acquired in the time acquiring step and information on capture time of the identification element acquired previously and stored in the dictionary-data generating information storing section in association with the person-specifying information acquired in the person-specifying step, and for adding and storing the computed weighting factor into the dictionary-data generating information storing section; and a dictionary data generating or updating step of assigning a corresponding weighting factor stored in the dictionary-data generating information storing section to feature data of the identification element acquired previously and stored in the dictionary-data generating information storing section in association with the person-specifying information acquired in the person-specifying step, assigning a weighting factor computed by the weighting factor computing step to feature data of the newly acquired identification element, and generating or updating the identification dictionary data stored in association with the person-specifying information acquired in the person-specifying step, by using the plurality of pieces of weighted feature data.

17. An updating program stored on a computer readable medium for identification dictionary data in a personal identification device that compares identification dictionary data of a person to be identified, which is generated from feature data extracted from an identification element for identifying the person and stored in association with person-specifying information for specifying the person, against feature data extracted from a captured identification element of a person to identify a person who has the captured identification element, the updating program being configured to generate or update the identification dictionary data by causing a computer to execute:

a time acquiring step of acquiring information on capture time of an identification element captured from the person;

a person-specifying step of obtaining the person-specifying information that specifies a person who has the captured identification element, on the basis of a result of identification of a person who has the captured identification element;

a dictionary-data generating information storing step of adding and storing data of the captured identification element of a person or feature data extracted from the identification element, and time information acquired in the time acquiring step into the dictionary-data generating information storing section, in association with the person-specifying information acquired in the person-specifying step; and a dictionary data update processing step of generating or updating the identification dictionary data corresponding to the person-specifying information acquired in the person-specifying means, by using information on capture time newly acquired in the time acquiring step, information on capture time of the identification element acquired previously and stored in the dictionary-data generating information storing section in association with the person-specifying information acquired in the person-specifying step, and feature data captured at each capture time, the dictionary data update processing step being configured to update the identification dictionary data by weighting each piece of the feature data by a weighting factor according to its capture time.

18. A personal identification device comprising:

a processor to perform the following:

a dictionary data storing section that stores identification dictionary data for a person to be identified, which is generated from feature data extracted from an identification element for identifying the person, in association with person-specifying information for specifying the person;

an identification section that compares feature data extracted from an identification element extracted from the person, against the identification dictionary data in the dictionary data storing section to identify a person who has the captured identification element;

a time acquiring section that acquires information on capture time of an identification element captured from the person;

a person-specifying section that obtains the person-specifying information that specifies a person who has the captured identification element, on the basis of a result of identification of the person by the identification section;

a dictionary-data generating information storing section that adds and stores data of the captured identification element or feature data extracted from the identification element, and time information acquired by the time acquiring section into the dictionary-data generating information storing section, in association with the person-specifying information acquired by the person-specifying section; and a dictionary data update processing section that generates or updates the identification dictionary data corresponding to the person-specifying information acquired by the person-specifying section, by using information on capture time newly acquired by the time acquiring section, information on capture time of the identification element acquired previously and stored in the dictionary-data generating information storing section in association with the person-specifying information acquired by the person-specifying section, and feature data captured at each capture time, the dictionary data update processing section being configured to update the identification dictionary data by weighting each piece of the feature data by a weighting factor according to its capture time.

* * * * *